US012654571B2

(12) United States Patent

Ng

(10) Patent No.: US 12,654,571 B2

(45) Date of Patent: Jun. 16, 2026

(54) WORK VEHICLE INCLUDING SIDE HOUSING SEPARATE FROM MAIN HOUSING

(71) Applicant: KUBOTA CORPORATION, Osaka (JP)

(72) Inventor: Fuk Ho Pius Ng, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 283 days.

(21) Appl. No.: 18/379,760

(22) Filed: Oct. 13, 2023

(65) Prior Publication Data

US 2025/0121704 A1 Apr. 17, 2025

(51) Int. Cl.
*B60L 50/60* (2019.01)
*B60L 50/64* (2019.01)

(52) U.S. Cl.
CPC .............. *B60L 50/64* (2019.02); *B60L 50/66* (2019.02); *B60L 2200/40* (2013.01)

(58) Field of Classification Search
CPC ...... B60L 50/64; B60L 50/66; B60L 2200/40; B60K 2001/0411; B60K 2001/0438; B60K 1/04; B60Y 2200/22; B60Y 2200/221; B60Y 2200/41
See application file for complete search history.

(56) References Cited

U.S. PATENT DOCUMENTS

| | | | |
|---|---|---|---|
| 9,616,736 B2 * | 4/2017 | Ito | B60K 17/043 |
| 11,407,298 B1 | 8/2022 | Boe et al. | |

| | | | |
|---|---|---|---|
| 2016/0293906 A1 * | 10/2016 | Ito | H01M 10/613 |
| 2017/0136864 A1 * | 5/2017 | Ito | H01M 10/6563 |
| 2020/0156500 A1 * | 5/2020 | Huff | B60L 7/10 |
| 2023/0191921 A1 * | 6/2023 | Kirst | E02D 3/032 |
| | | | 404/75 |

FOREIGN PATENT DOCUMENTS

| | | | | |
|---|---|---|---|---|
| CN | 209008372 U | * | 6/2019 | B60L 50/64 |
| CN | 211764962 U | * | 10/2020 | B60K 1/04 |
| CN | 113696707 A | * | 11/2021 | H01M 50/204 |
| JP | 2004168149 A | * | 6/2004 | E02F 9/0858 |

OTHER PUBLICATIONS

Ng, "Work Vehicle With Vertically Overlapping Battery Housings", U.S. Appl. No. 18/379,754, filed Oct. 13, 2023.
Ng, "Work Vehicle With Battery Modules Provided in Multiple Battery Groups", U.S. Appl. No. 18/379,755, filed Oct. 13, 2023.
Wright et al., "Work Vehicle With Horizontally Offset Battery Housings", U.S. Appl. No. 18/379,757, filed Oct. 13, 2023.
Ng, "Work Vehicle Including Side Battery Housing", U.S. Appl. No. 18/379,758, filed Oct. 13, 2023.
Ng et al., "Battery Housing for Electric Work Vehicle", U.S. Appl. No. 29/904,908, filed Oct. 13, 2023.
Ng et al., "Battery Housing for Electric Work Vehicle", U.S. Appl. No. 29/904,909, filed Oct. 13, 2023.

* cited by examiner

*Primary Examiner* — Tisha D Lewis

(74) *Attorney, Agent, or Firm* — Keating & Bennett, LLP

(57) ABSTRACT

A work vehicle includes a main body, at least one front wheel supported by the main body, at least one rear wheel supported by the main body, a first housing to house one or more first battery modules, a second housing to house one or more second battery modules, and a first side housing that is separate from the first housing and the second housing. The first housing at least partially overlaps the second housing.

14 Claims, 22 Drawing Sheets

FRONT    RIGHT

LEFT    REAR

REAR ◄──────► FRONT

FRONT ←——→ REAR

REAR ←→ FRONT

110

RIGHT ⬌ LEFT

110

RIGHT ←——→ LEFT

WORK VEHICLE INCLUDING SIDE HOUSING SEPARATE FROM MAIN HOUSING

BACKGROUND OF THE INVENTION

1. Field of the Invention

The present invention relates to a layout of an electrical power supply system for a vehicle.

2. Description of the Related Art

Known electric work vehicles or tractors have included battery storages to supply electrical power to the electric work vehicles or tractors, for example, to drive an electric motor. However, known work electric vehicles or tractors have been limited in the storage capacity for batteries due to limited space provided in a main housing of the known electric work vehicles or tractors. For example, a turning degree of front wheels included in known electric work vehicles or tractors have generally prevented locating battery storage space between the right and left front wheels. In addition, known work electric vehicles or tractors have generally not included separate battery housings, which can be spaced away from one another, to increase an electrical power storage capacity.

U.S. Pat. No. 11,407,298 discloses a removable battery unit for an electric vehicle. In particular, U.S. Pat. No. 11,407,298 teaches that a single housing includes a total of twenty-four batteries, which are provided in two series-connected battery sets of twelve batteries wired in parallel. However, U.S. Pat. No. 11,407,298 does not disclose any separate battery housings for additional groups or sets of batteries, and U.S. Pat. No. 11,407,298 also fails to disclose any specific processes or control operations to charge and/or discharge the batteries in predetermined groups. In addition, U.S. Pat. No. 11,407,298 includes rows of batteries that are partially vertically offset, which provides gaps in the single housing that reduce an efficiency of usage of the space to store the batteries. Furthermore, the electric vehicle of U.S. Pat. No. 11,407,298 includes track assemblies for motive power. If the track assemblies of U.S. Pat. No. 11,407,298 were to be replaced by wheels, for example, an ability of the wheels to turn would be significantly limited by the space required by the removable battery unit.

SUMMARY OF THE INVENTION

Preferred embodiments of the present invention provide an electric work vehicle or a tractor that is able to provide increased space for storing batteries and improved efficiency of use of battery storage space. In addition, the increased space for storing batteries can be provided without adversely affecting the motive operation of the electric work vehicle or tractor, for example, without affecting a turning degree of the wheels of the electric work vehicle or tractor.

A vehicle includes a main body, at least one front wheel supported by the main body, at least one rear wheel supported by the main body, a first housing to house one or more first battery modules, and a second housing to house one or more second battery modules. The first housing at least partially overlaps the second housing.

The one or more first battery modules and the one or more second battery modules can be a same type of battery module. The first housing can be located forward of the at least one rear wheel, and the second housing can be located forward of the at least one rear wheel. The main body can include a cover that is openable and/or removable to provide access to the first housing and the second housing.

The first housing can include one or more first openings that are configured to receive the one or more first battery modules, and the second housing can include one or more second openings that are configured to receive the one or more second battery modules. The first openings and the second openings can face a width direction of the vehicle. The first openings can provide access to first sub-housings that each receive a separate one of the one or more first battery modules, and the second openings can provide access to second sub-housings that each receive a separate one of the one or more second battery modules.

According to a preferred embodiment of the present invention, a work vehicle includes a main body, at least one front wheel supported by the main body, at least one rear wheel supported by the main body, a first housing to house one or more first battery modules, a second housing to house one or more second battery modules, and a first side housing that is separate from the first housing and the second housing. The first housing at least partially overlaps the second housing.

The one or more first battery modules and the one or more second battery modules can be a same type of battery module.

The first housing can include one or more first openings that are configured to receive the one or more first battery modules. The second housing can include one or more second openings that are configured to receive the one or more second battery modules. The one or more first openings and the one or more second openings can face a width direction of the work vehicle. The one or more first openings can provide access to first sub-housings that each receive a separate one of the one or more first battery modules, and the one or more second openings can provide access to second sub-housings that each receive a separate one of the one or more second battery modules.

The first side housing can include one or more third battery modules. The first side housing can be spaced away from the first housing and the second housing. The one or more third battery modules included in the first side housing can be electrically connected to at least the one or more second battery modules included in the second housing.

In a plan view, an outer surface of the first side housing can be located closer to a center line of the work vehicle than an outer surface of the at least one front wheel. In a plan view, an outer surface of the first side housing can be located closer to a center line of the work vehicle than an outer surface of the at least one rear wheel.

A line extending from an outer surface of the first side housing in a front-rear direction of the work vehicle can pass through the at least one front wheel. A line extending from an outer surface of the first side housing in a front-rear direction of the work vehicle can passe through the at least one rear wheel.

The work vehicle can further include a second side housing that includes one or more of the third battery modules. The second side housing can be spaced away from the first housing, the second housing, and the first side housing. The one or more third battery modules included in the second side housing can be electrically connected to at least the one or more second battery modules included in the second housing.

In a plan view, an outer surface of the second side housing can be located closer to a center line of the work vehicle than an outer surface of the at least one front wheel. In a plan view, an outer surface of the second side housing can be located closer to a center line of the work vehicle than an outer surface of the at least one rear wheel.

A line extending from an outer surface of the second side housing in a front-rear direction of the work vehicle housing can pass through the at least one front wheel. A line extending from an outer surface of the second side housing in a front-rear direction of the work vehicle can pass through the at least one rear wheel.

The work vehicle can further include a transmission driven by an electric motor that drives one or more of the at least one front wheel and the at least one rear wheel. The transmission can be mounted between the first side housing and the second side housing in width direction of the work vehicle. The electric motor can be mounted in front of a line extending from a front surface of the first housing and second side housing.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
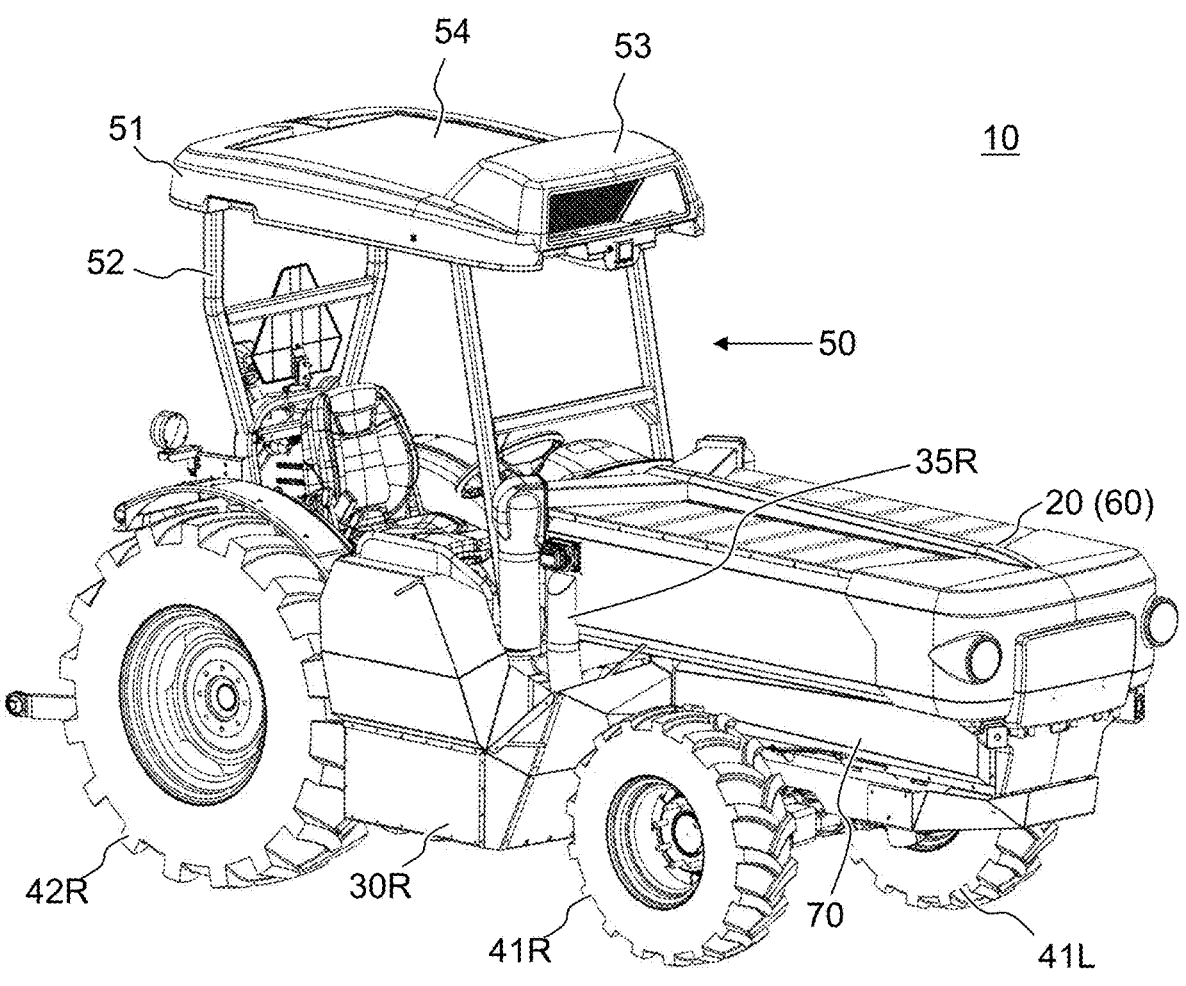
FIGS. 1 and 2 are perspective views of a vehicle according to a preferred embodiment of the present invention.
Figure 1:
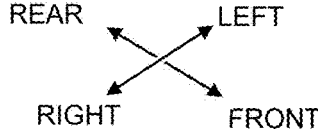
Figure 2:
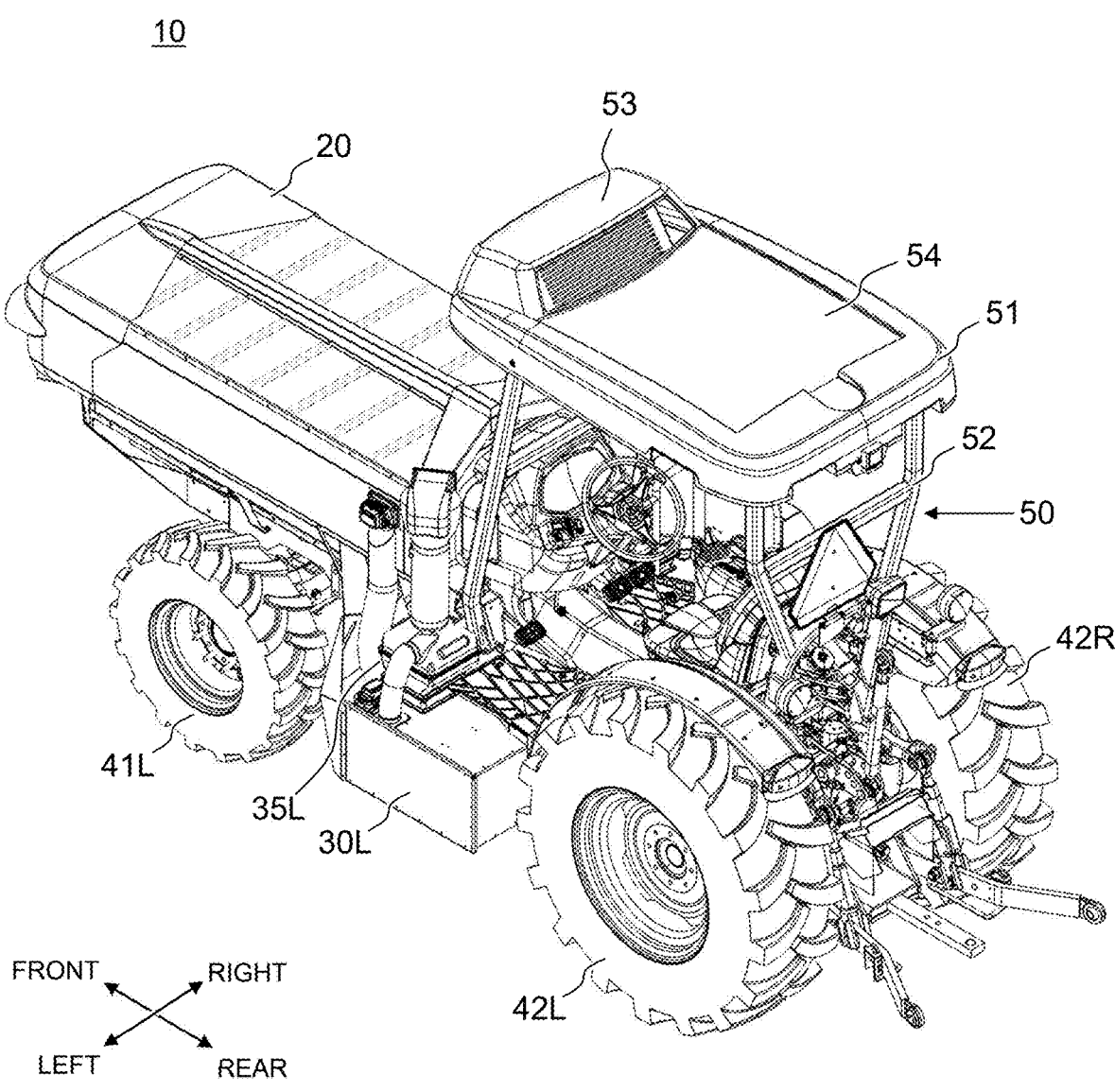
Figure 3:
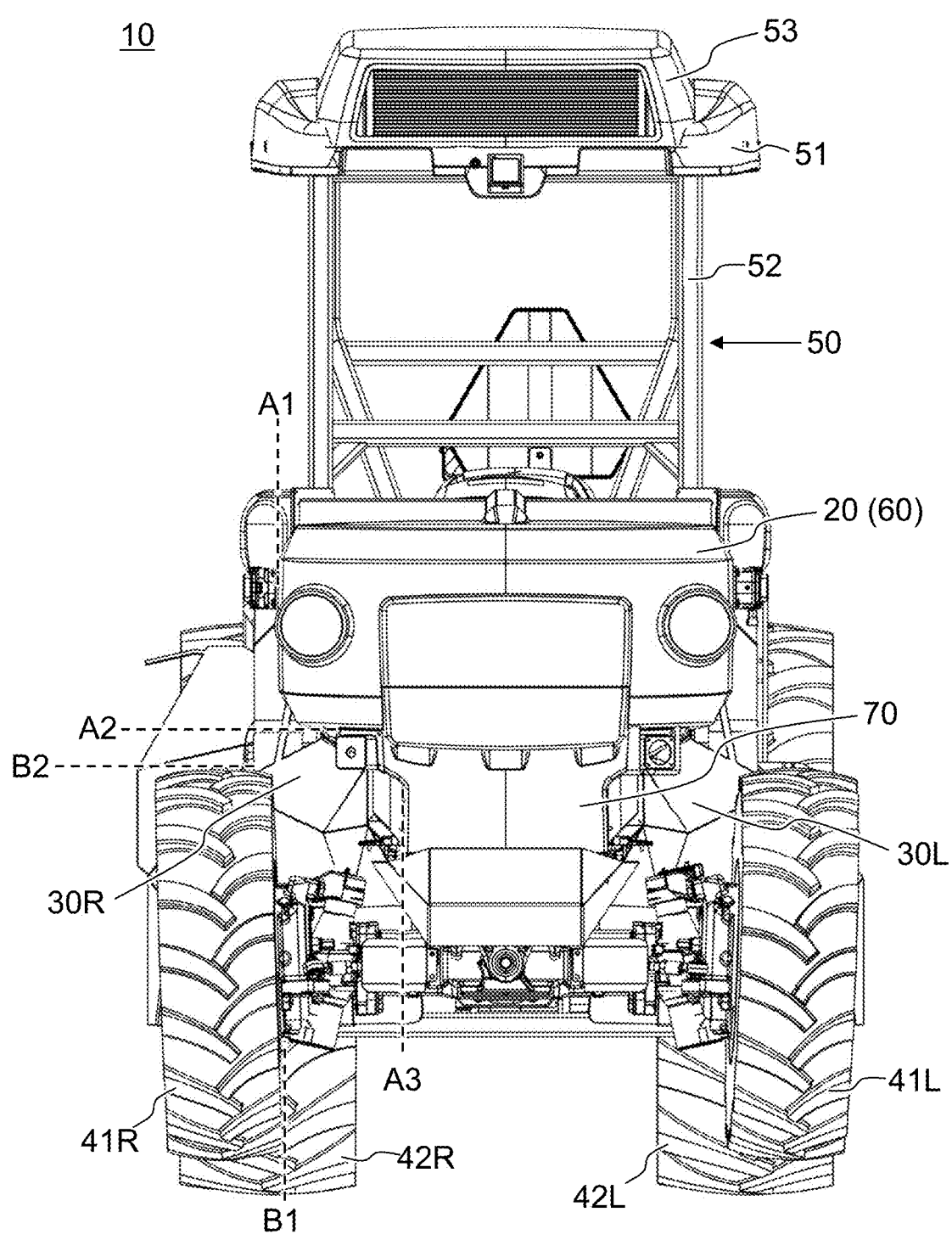
FIG. 3 is a front view of the vehicle shown in FIG. 1.
Figure 4:
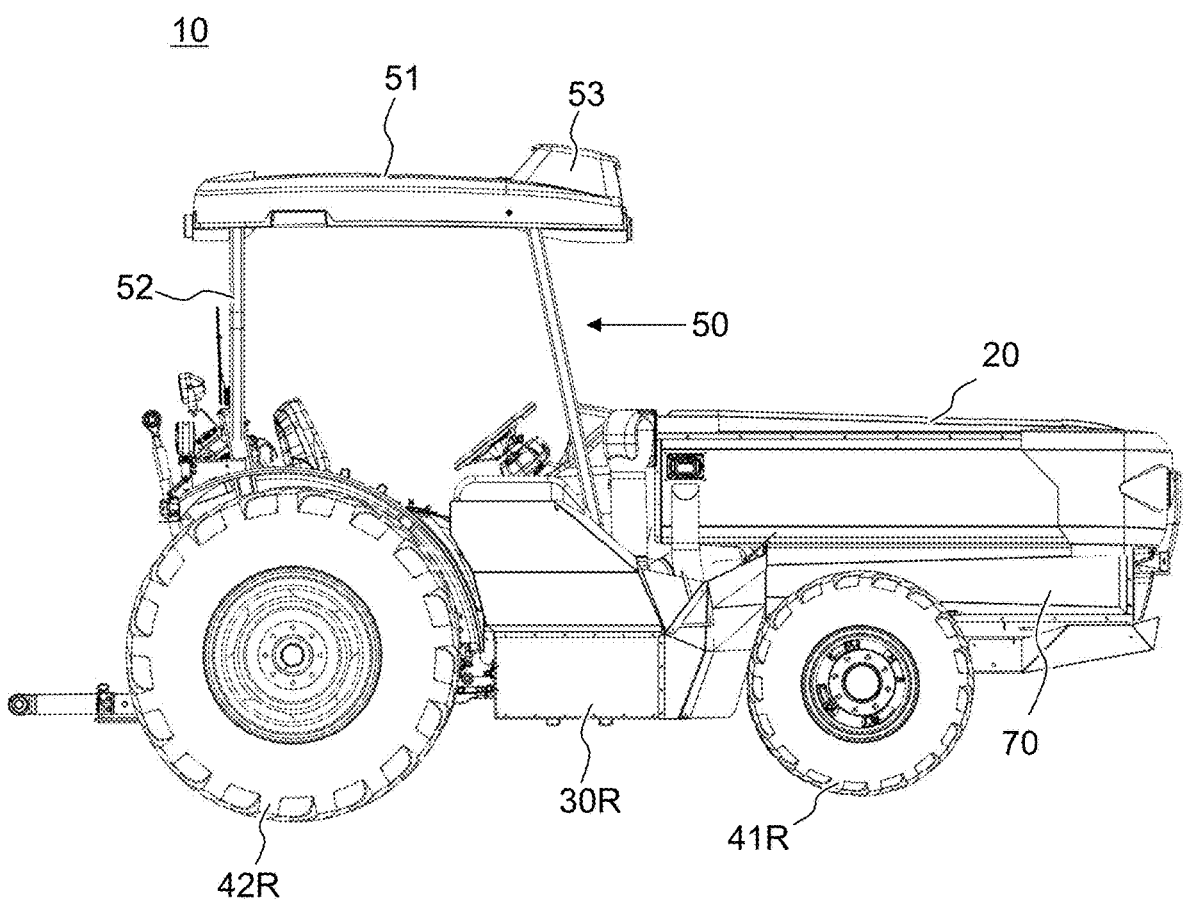
FIGS. 4 and 5 are side views of the vehicle shown in FIG. 1.
Figure 5:
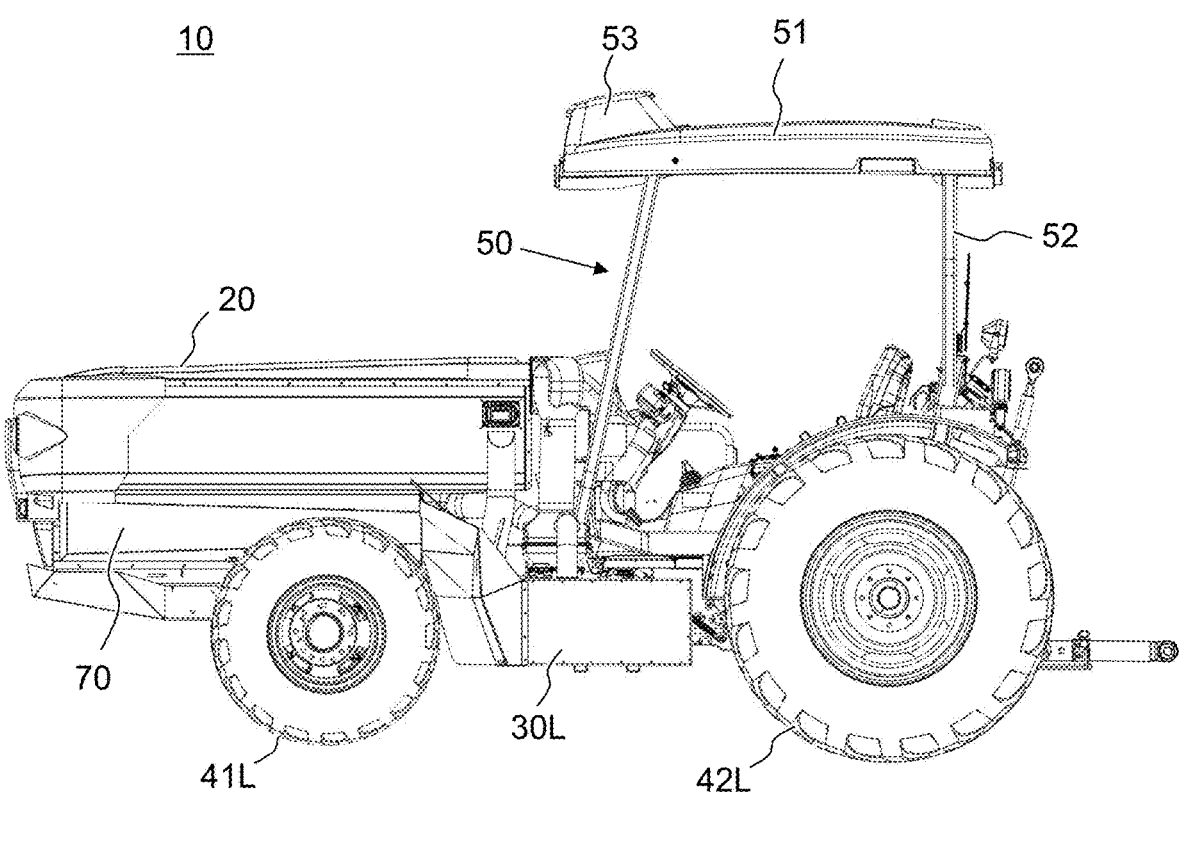
Figure 6:
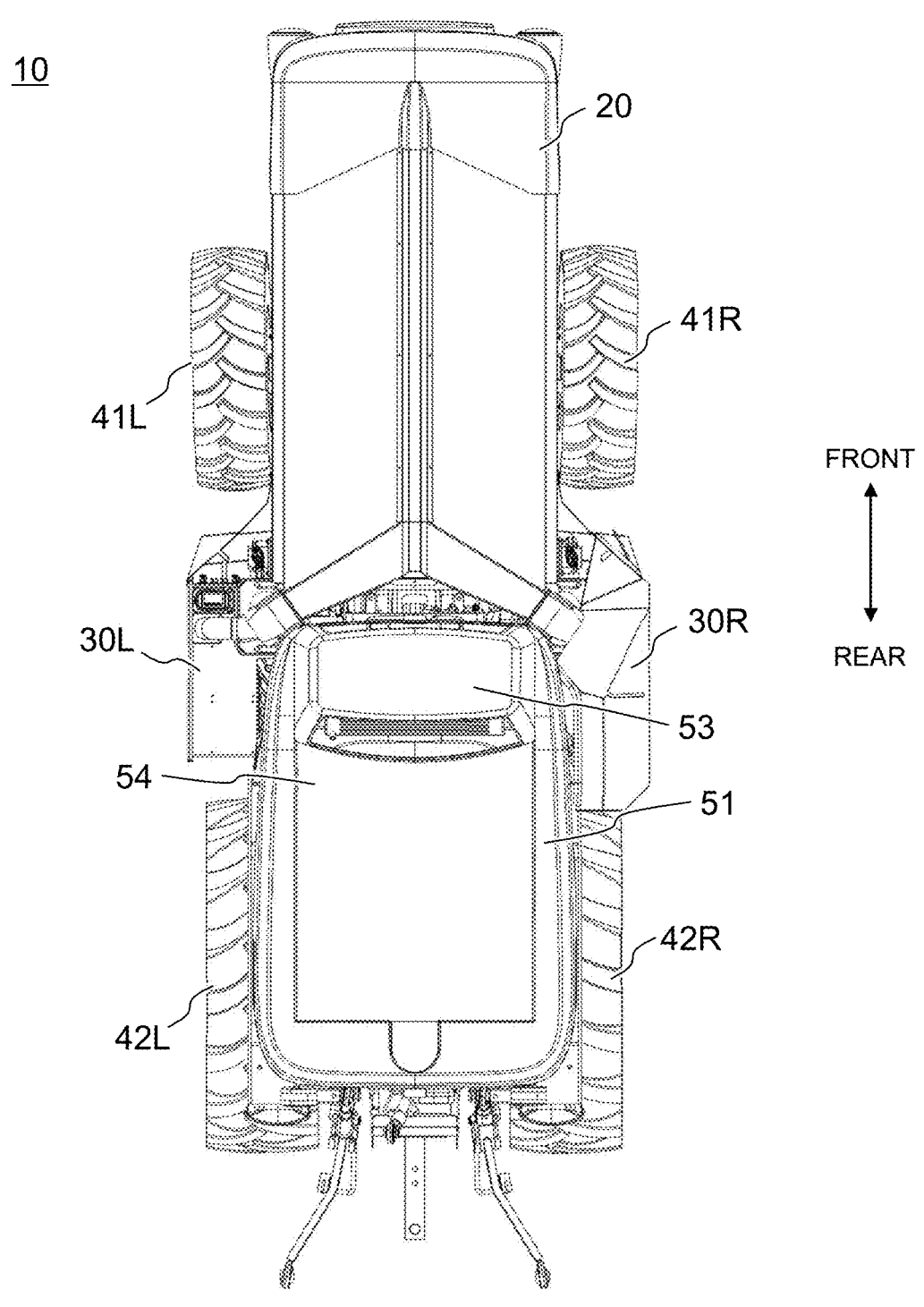
FIG. 6 is a top view of the vehicle shown in FIG. 1
Figure 7:
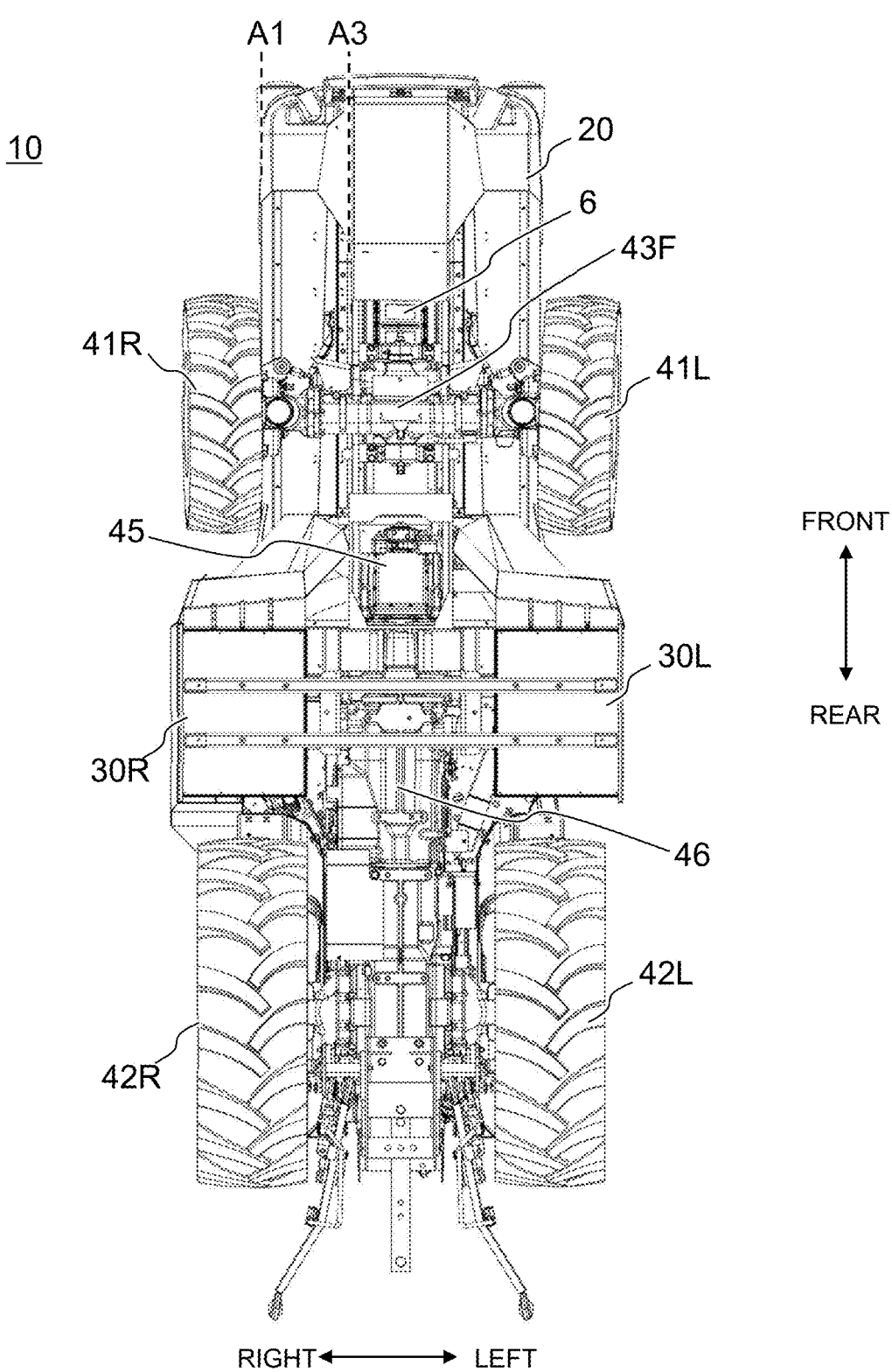
FIG. 7 is a bottom view of the vehicle shown in FIG. 1

FIGS. 1-7 show a vehicle 10 according to a preferred embodiment of the present invention. FIG. 1 shows an isometric view from a first (front) end of the vehicle 10, and FIG. 2 shows an isometric view from a second (rear) end of the vehicle 10. FIG. 3 shows a front view of the vehicle 10, and FIGS. 4 and 5 are side views of the vehicle 10. FIGS. 6 and 7 are top and bottom views of the vehicle 10, respectively.

As shown in FIGS. 1-7, the vehicle 10 includes a main housing 20, and at least a portion of an electrical power supply system for the vehicle 10 can be provided within the main housing 20. The main housing 20 can include a cover that protects the electrical power supply components provided within the main housing 20, and can be provided with removable, latched, and/or hinged housing components to enable access to an interior of the main housing 20.

As further shown in FIGS. 1-7, the vehicle 10 also includes a left front wheel 41L, a right front wheel 41R, a left rear wheel 42L, and a right rear wheel 42R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels, a wheel provided at a front or rear of the vehicle, etc.), six total wheels by including a pair of center wheels, and the like. According to other preferred embodiments of the present invention, a vehicle can include one or more tracks or treads in place of one or more of the wheels.

The vehicle 10 can also include one or more side housings 30, and the one or more side housings 30 can store further portion(s) of the electrical power supply system for the vehicle 10. The one or more side housings 30 can be spaced away from the main housing 20. As shown in FIGS. 1-7, the vehicle 10 can include a first (left) side housing 30L and a second (right) side housing 30R. The first side housing 30L can be located at least partially between the left front wheel 41L and the left rear wheel 42L, and the second side housing 30R can be located at least partially between the right front wheel 41L and the right rear wheel 42R. As shown in FIGS. 1 and 2, the vehicle 10 can also include an air circulation system with first (left) side ducting 35L that provides air flow path(s) between the first side housing 30L and the main housing 20. The vehicle 10 can also include second (right) side ducting 35R that provides air flow path(s) between the second side housing 30R and the main housing 20. The air flow path(s) provided by the first side ducting 35L and the second side ducting 35R can be used to provide cooling for portion(s) of the electrical power supply system for the vehicle 10 that are stored in the first side housing 30L or the second side housing 30R.

The electrical power supply system for the vehicle 10 can supply electrical power to an electric motor 45, shown in FIG. 7. The electrical power can be supplied to the electric motor 45 via an inverter, for example. The electric motor 45 can be located between the first side housing 30L and the second side housing 30R in a width/side (left-right) direction of the vehicle 10, and the electric motor 45 can be located forward of the first side housing 30L and the second side housing 30R in a front-rear direction of the vehicle 10. In particular, the electric motor 45 can be located in front of a line that extends between a frontmost surface of the first side housing 30L and a frontmost surface of the second side housing 30R. The vehicle 10 can include a transmission 46 to drive each of the left front wheel 41L, the right front wheel 41L, the left rear wheel 42L, and the right rear wheel 42R in a four-wheel drive arrangement. However, the electric motor 45 and the transmission 46 can also be implemented in two-wheel drive arrangements. As shown in FIG. 7, the transmission 46 can be mounted between the first side housing 30L and the second side housing 30R in the width/side (left-right) direction of the vehicle 10.

The vehicle 10 can also include a cabin 50 or the like with a roof 51 supported by a frame 52. The cabin 50 or the like can include various components, for example, a seat for an operator of the vehicle 10 and vehicle controls such as a steering wheel. The roof 51 can optionally be provided with a radiator and condenser module 53 and/or a solar panel 54.

Figure 8:
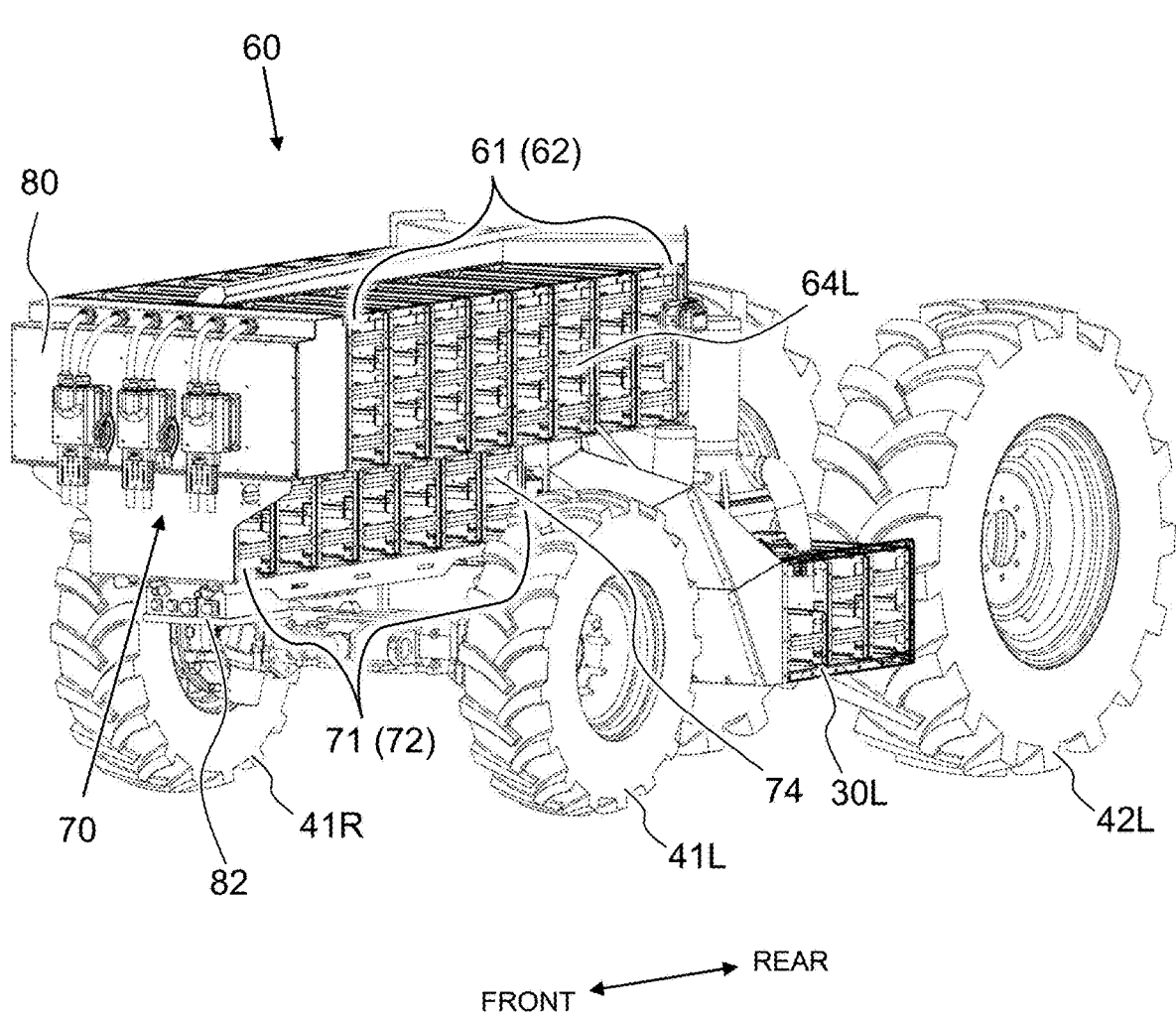
FIGS. 8 and 9 are perspective views of a portion of the vehicle shown in FIG. 1 with a main housing and a cabin removed for clarity.
Figure 9:
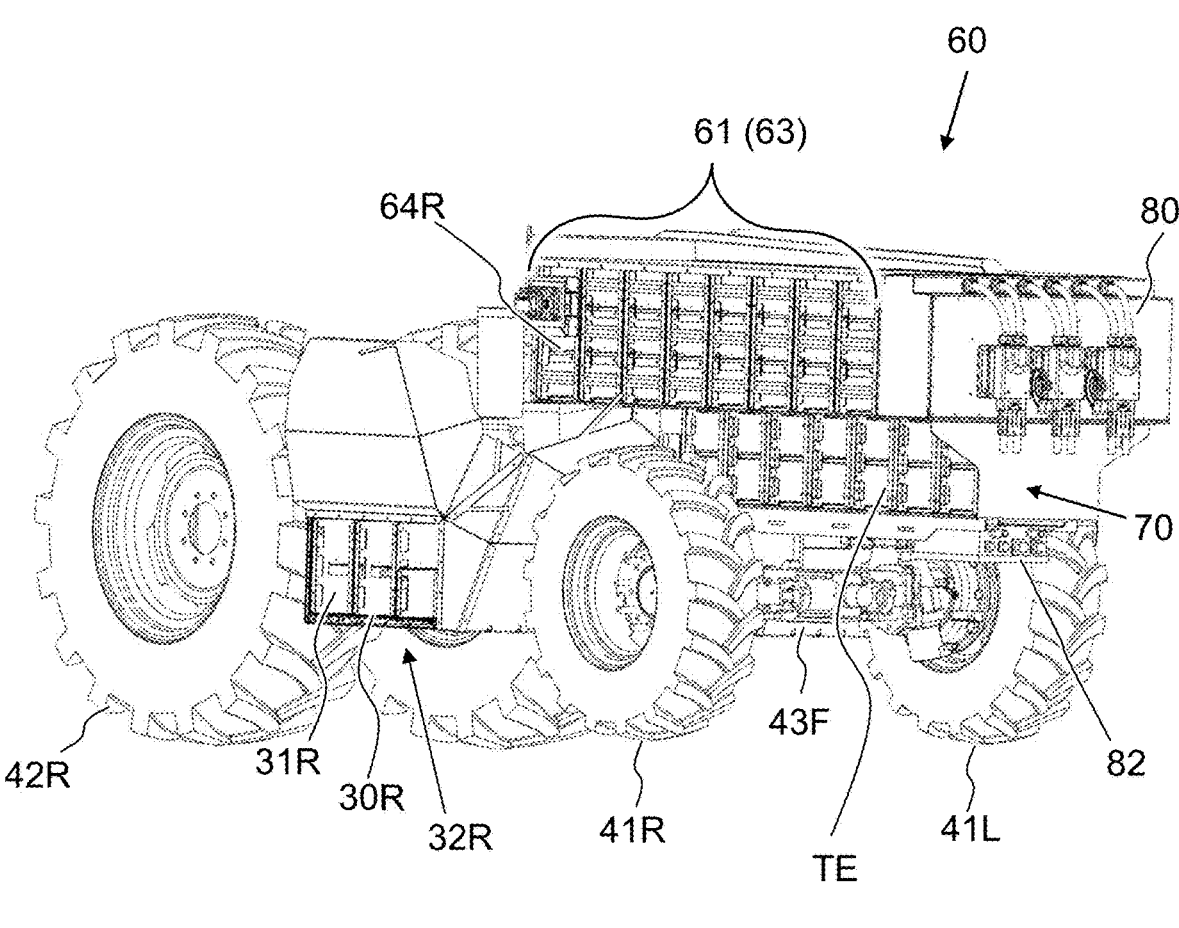
Figure 10A:
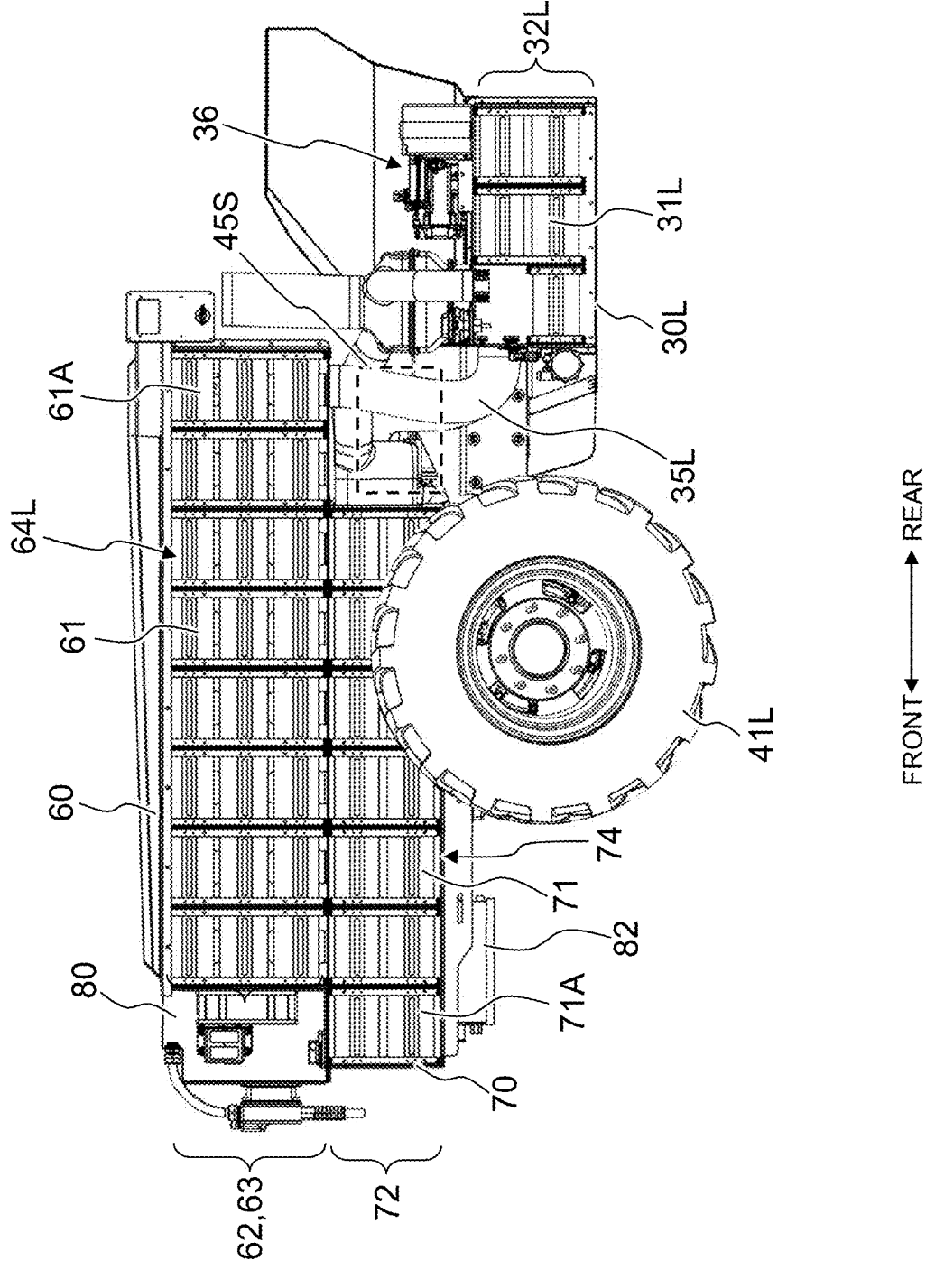
FIG. 10A is a side view of a portion of the vehicle shown in FIG. 1 with the main housing, the cabin, and rear wheels removed for clarity.
Figure 10B:
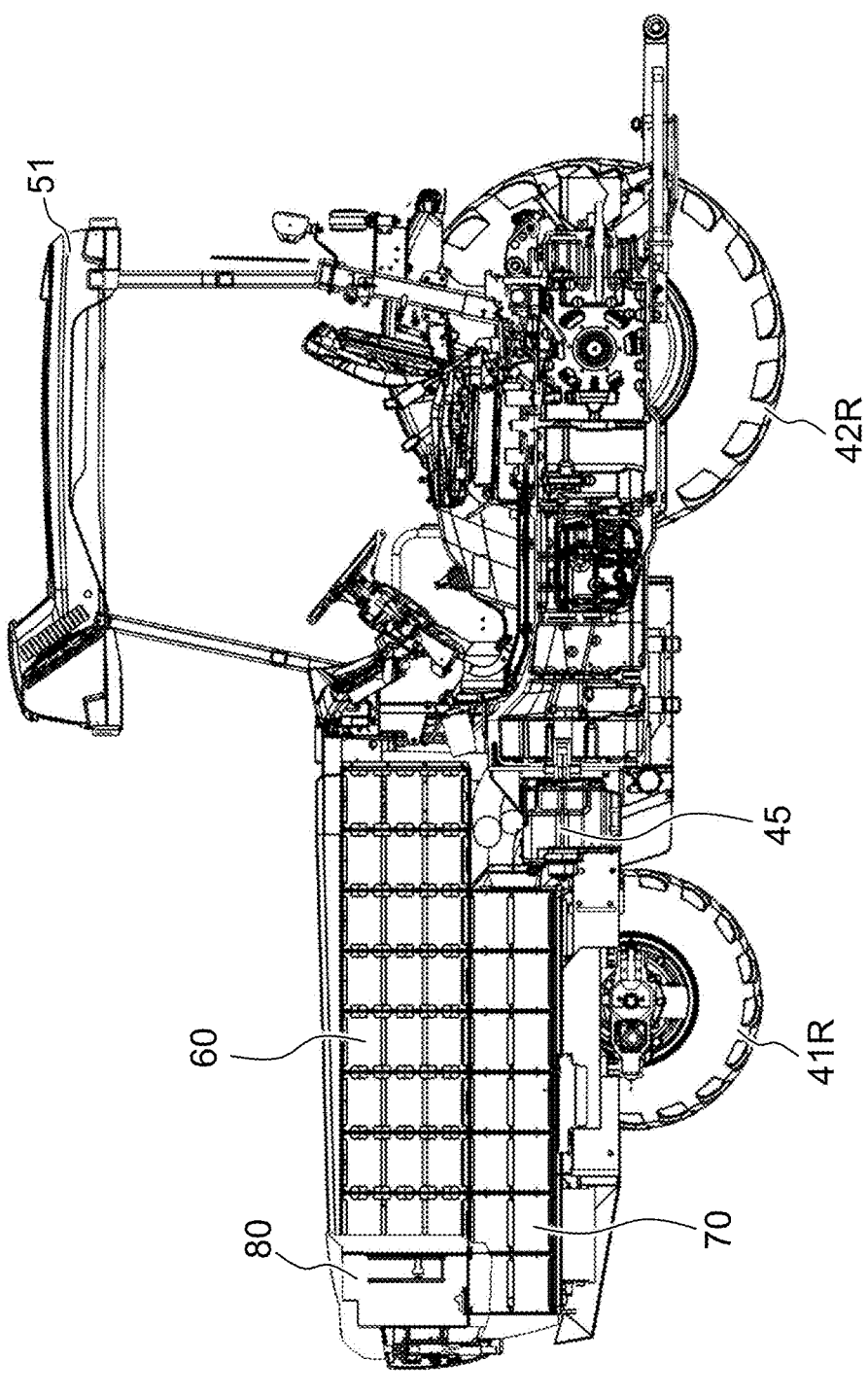
FIG. 10B is a cross-sectional side view of the vehicle shown in FIG. 1.
Figure 11:
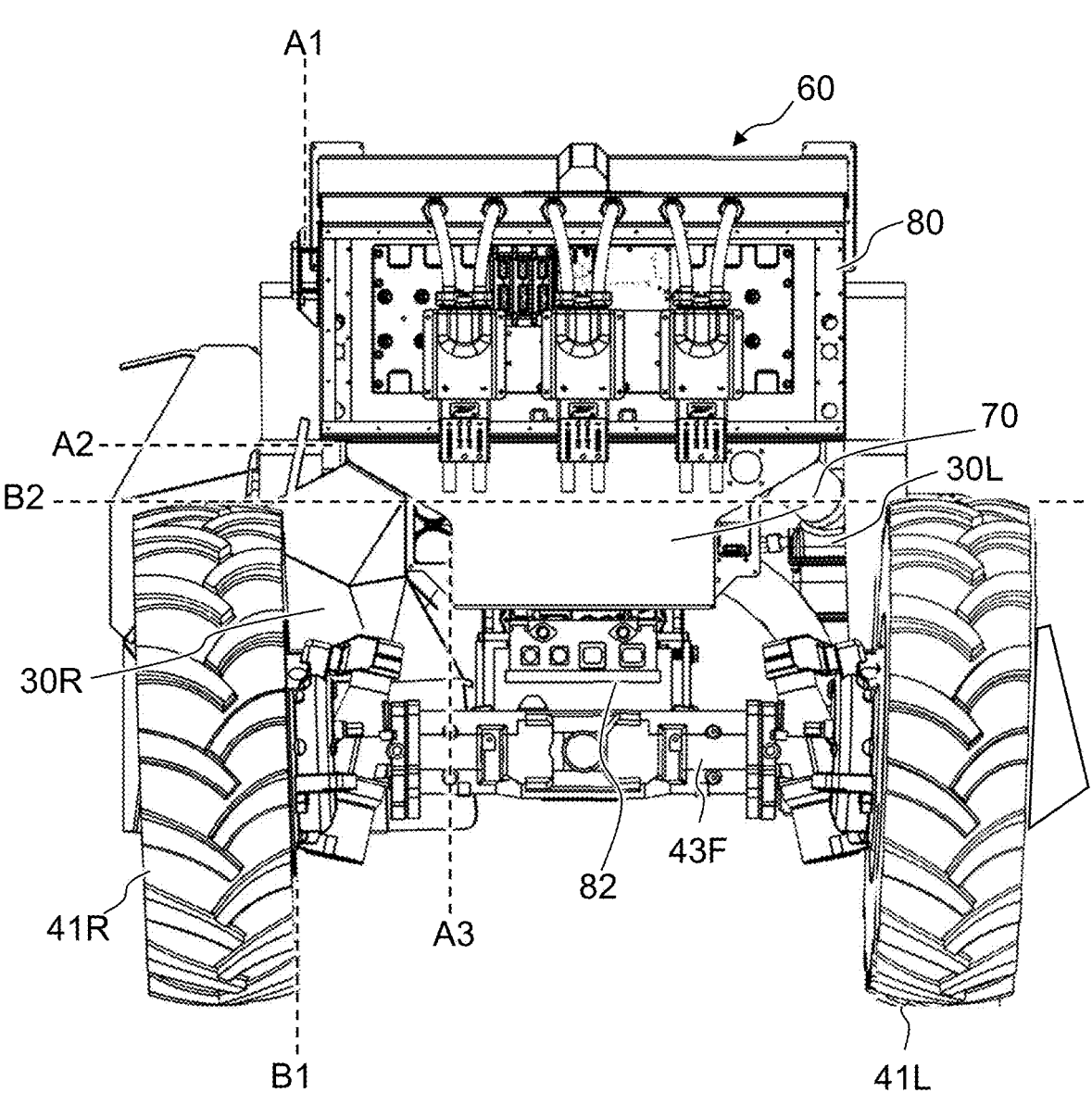
FIG. 11 is a front view of a portion of the vehicle shown in FIG. 1 with the main housing, the cabin, and the rear wheels removed for clarity.
Figure 12:
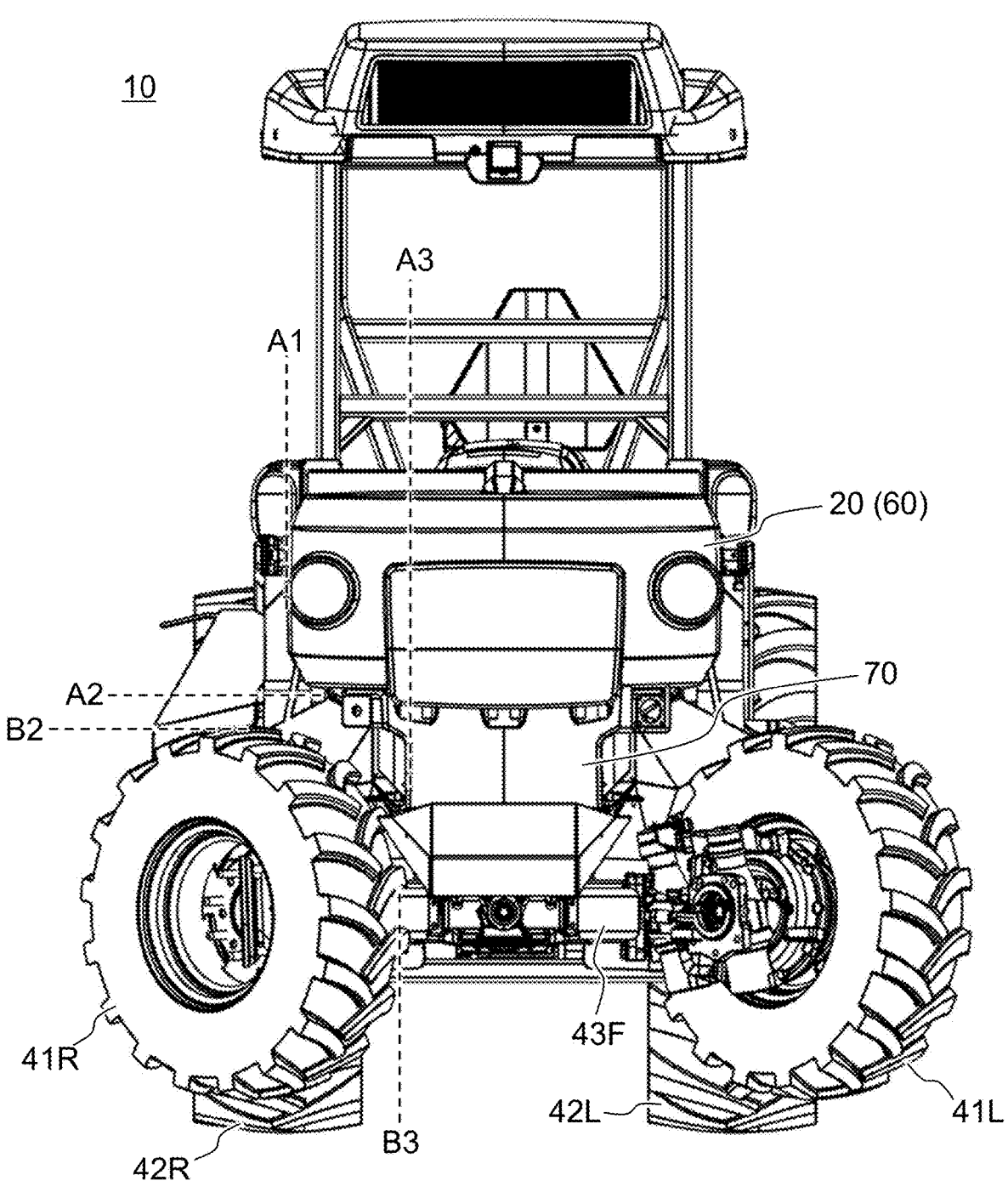
FIG. 12 is a front view of the vehicle shown in FIG. 1 with the front wheels turned.

FIGS. 8, 9, 10A, and 11 show views of the vehicle 10 with the main housing 20, the cabin 50, and other covers and components removed for clarity. More specifically, FIGS. 8 and 9 are perspective views of a portion of the vehicle 10 with the main housing 20 and the cabin 50 removed for clarity. FIG. 10A is a side view of a portion of the vehicle 10 with the main housing 20, the rear wheels 42L and 42R, and the cabin 50 removed for clarity. FIG. 11 is a front view of a portion of the vehicle 10 with the main housing 20, the rear wheels 42L and 42R, and the cabin 50 removed for clarity. FIG. 10B is a cross-sectional side view of the vehicle 10.

As shown in FIGS. 8, 9, 10A, and 10B, the electrical power supply system for the vehicle includes a first battery housing 60 and a second battery housing 70. The first battery housing 60 and the second battery housing 70 can be spaced away from the first side housing 30L and the second side housing 30R.

Figure 16:
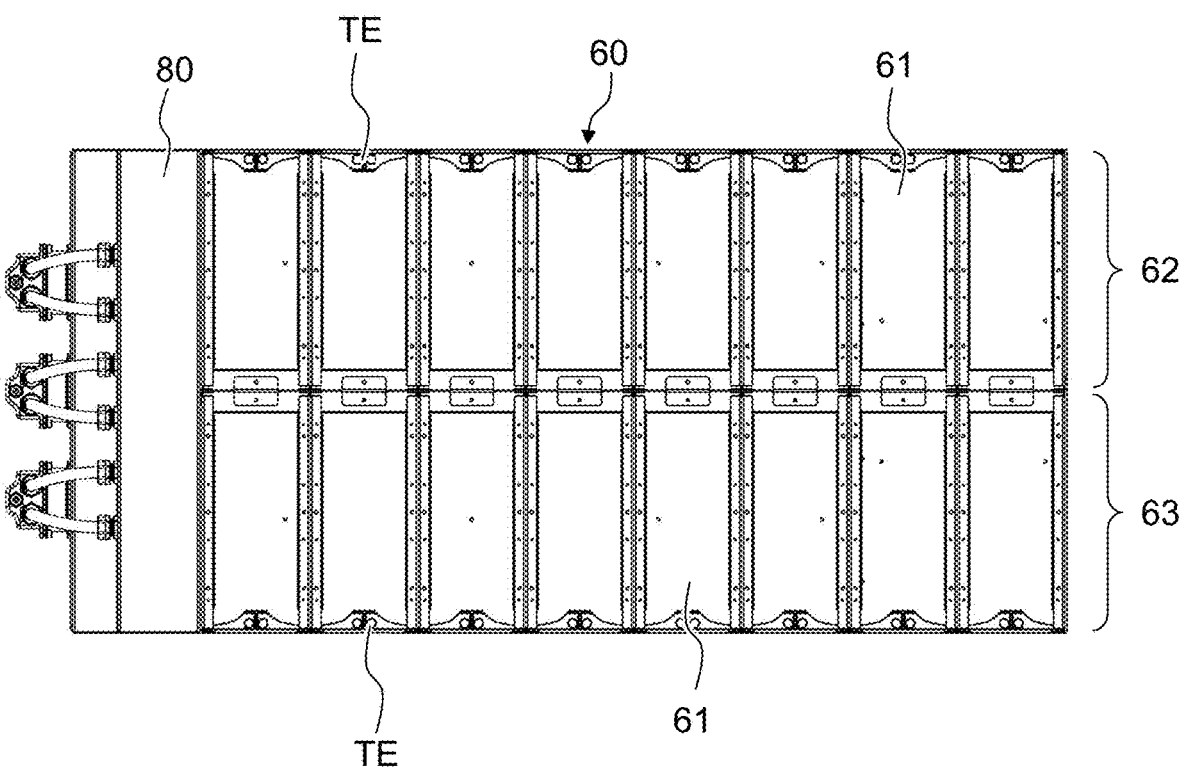
FIG. 16 is a top view of a battery housing included in the vehicle shown in FIG. 1.

The first battery housing 60 can include a plurality of battery modules 61, and the second battery housing 70 can include a plurality of battery modules 71. As shown in FIGS. 8, 9, and 10A, the first battery housing 60 can include a plurality of openings 64R and 64L to a plurality of sub-housings that each receive a separate one of the battery modules 61, and the second battery housing 70 can include a plurality of openings 74 to a plurality of sub-housings that each receive a separate one of the plurality of battery modules 71. The plurality of openings 64L and 64R of the first battery housing 60 and the plurality of openings 74 of the second battery housing 70 can face a width/side (left-right) direction of the vehicle 10. Accordingly, some or all of the plurality of battery modules 61 and the plurality of battery modules 71 can be installed in the width/side (left-right) direction of the vehicle 10. In addition, the plurality of openings 64L and 64R of the first battery housing 60 and the plurality of openings 74 of the second battery housing 70 can face a terminal end TE of some or all of the plurality of battery modules 61 and the plurality of battery modules 71, an example of which is shown in FIG. 16.

As further shown in FIGS. 8, 9, and 10A, the plurality of openings 64R and 64L can be respectively provided on both right and left sides of the first housing 60 in the width/side (left-right) direction of the vehicle 10. In addition, each of the plurality of openings 74 can be provided on the left side of the second battery housing 70 in the width/side (left-right) direction of the vehicle 10. However, the arrangement of the plurality of openings 64R, 64L, and 74 is not limited, and each of the first battery housing 60 and of the second battery housing 70 can include openings on only a right side, on only a left side, or on both right and left sides in the width/side (left-right) direction of the vehicle 10.

The plurality of battery modules 61 can be aligned, or substantially aligned, in rows and columns in both a vertical direction of the vehicle and the front-rear direction of the vehicle to provide compact storage of the plurality of battery modules 61 and reduce a space required by the first battery housing 60. Similarly, the plurality of battery modules 71 can be aligned, or substantially aligned, in rows and columns in both a vertical direction of the vehicle and the front-rear direction of the vehicle to provide compact storage of the plurality of battery modules 71 and reduce a space required by the second battery housing 70. One or both of the first battery housing 60 and the second battery housing 70 can be devoid of any void space in order to further reduce a space required to store the plurality of battery modules 61 and the plurality of battery modules 71 and to increase or maximize the usage efficiency of the battery storage space.

A power converter 82 can be attached to a bottom surface of the second battery housing 70, as shown in FIGS. 8, 9, 10A, and 11. The power converter 82 can be a DC-DC converter, an AC-DC converter, or a combination of a DC-DC converter and an AC-DC converter. The power converter 82 can be liquid-cooled or air-cooled. The power converter 82 can include, or be electrically connected to, an inverter to supply power to the electric motor 45.

A front axle 43F of the vehicle 10 can be located below the second battery housing 70, and can connect the left front wheel 41L and the right front wheel 41L. However, the front axle 43F can alternatively extend through at least a portion of the second battery housing 70.

The first battery housing 60 and the second battery housing 70 can be arranged in a "T" shape, as shown in FIG. 11. That is, the first battery housing 60 can have a width that is greater than a width of the second battery housing 70 in a width/side (left-right) direction of the vehicle, such that the first battery housing 60 can extend beyond the second battery housing 70 in the width/side (left-right) direction of the vehicle. The structure of the first battery housing 60 overhanging/extending farther than the second battery housing 70 in the width direction of the vehicle can provide a space for the front wheels of the vehicle to operate and turn, as described below.

As shown in FIGS. 3 and 11, an outer edge A1 of the main housing 20 or the first battery housing 60 can be located inside of an inner edge B1 of each of the front wheels 41R and 41L in the width direction of the vehicle. Furthermore, a lower edge A2 of the main housing 20 or the first battery housing 60 can be spaced away by a predetermined distance from an upper edge B2 of each of the front wheels 41R and 41L. However, a line connecting the upper edge B2 of each of the front wheels 41R and 41L may pass through a center portion of the second battery housing 70. That is, in a vertical direction of the vehicle 10, the line connecting the upper edge B2 of each of the front wheels 41R and 41L may be located between an upper surface of the second battery housing 70 and a lower surface of the second battery housing 70 in the vertical direction of the vehicle.

Alternatively, the outer edge A1 of the main housing 20 or the first battery housing 60 can be aligned or substantially aligned with the inner edge B1 of each of the front wheels 41R and 41L, or the outer edge A1 of the main housing 20 or the first battery housing 60 can be located outside of the inner edge B1 of each of the front wheels 41R and 41L.

Figure 13:
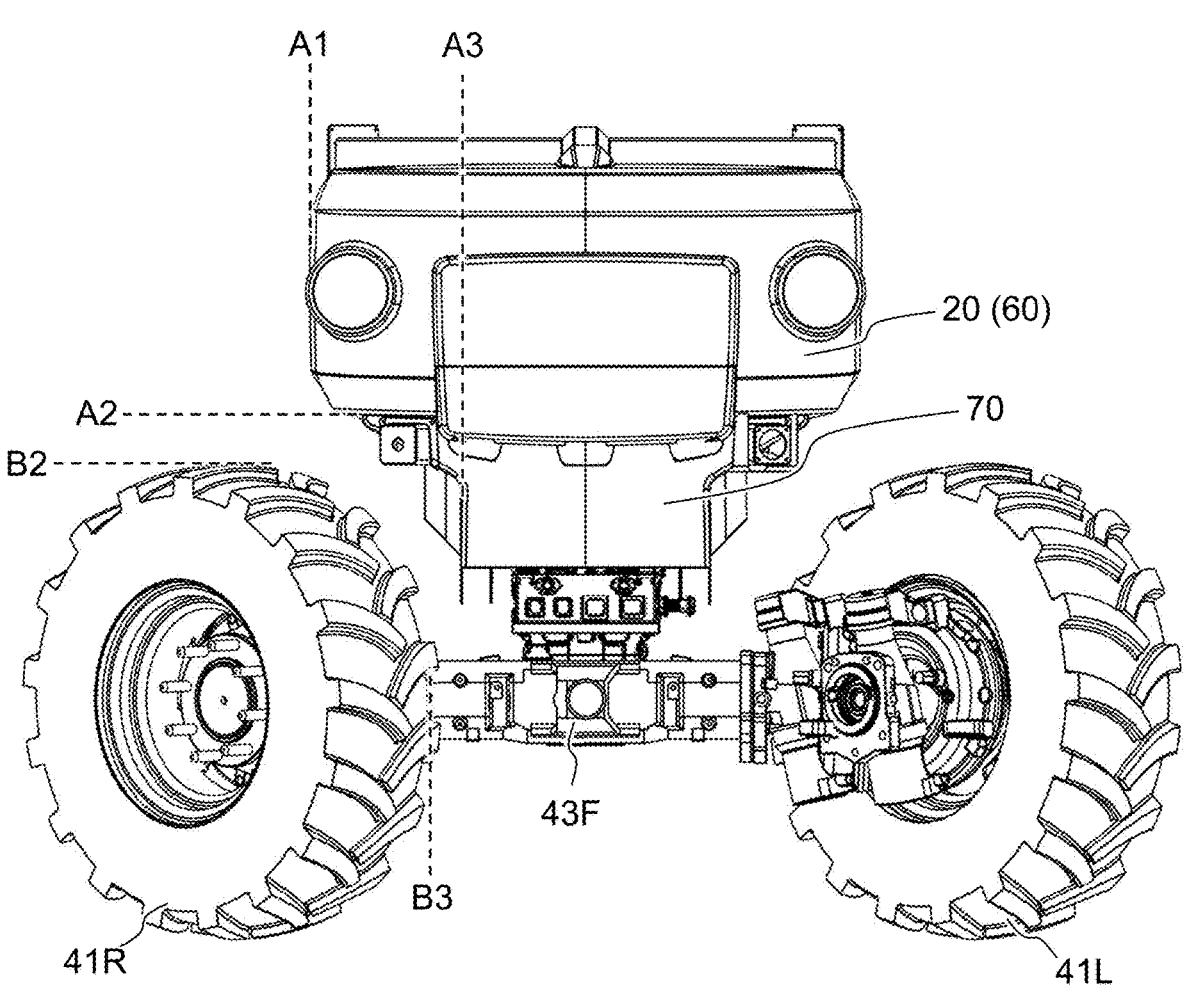
FIG. 13 is a front view of the vehicle shown in FIG. 1 with the front wheels turned and with the cabin, the rear wheels, and the side housings removed for clarity.
Figure 14:
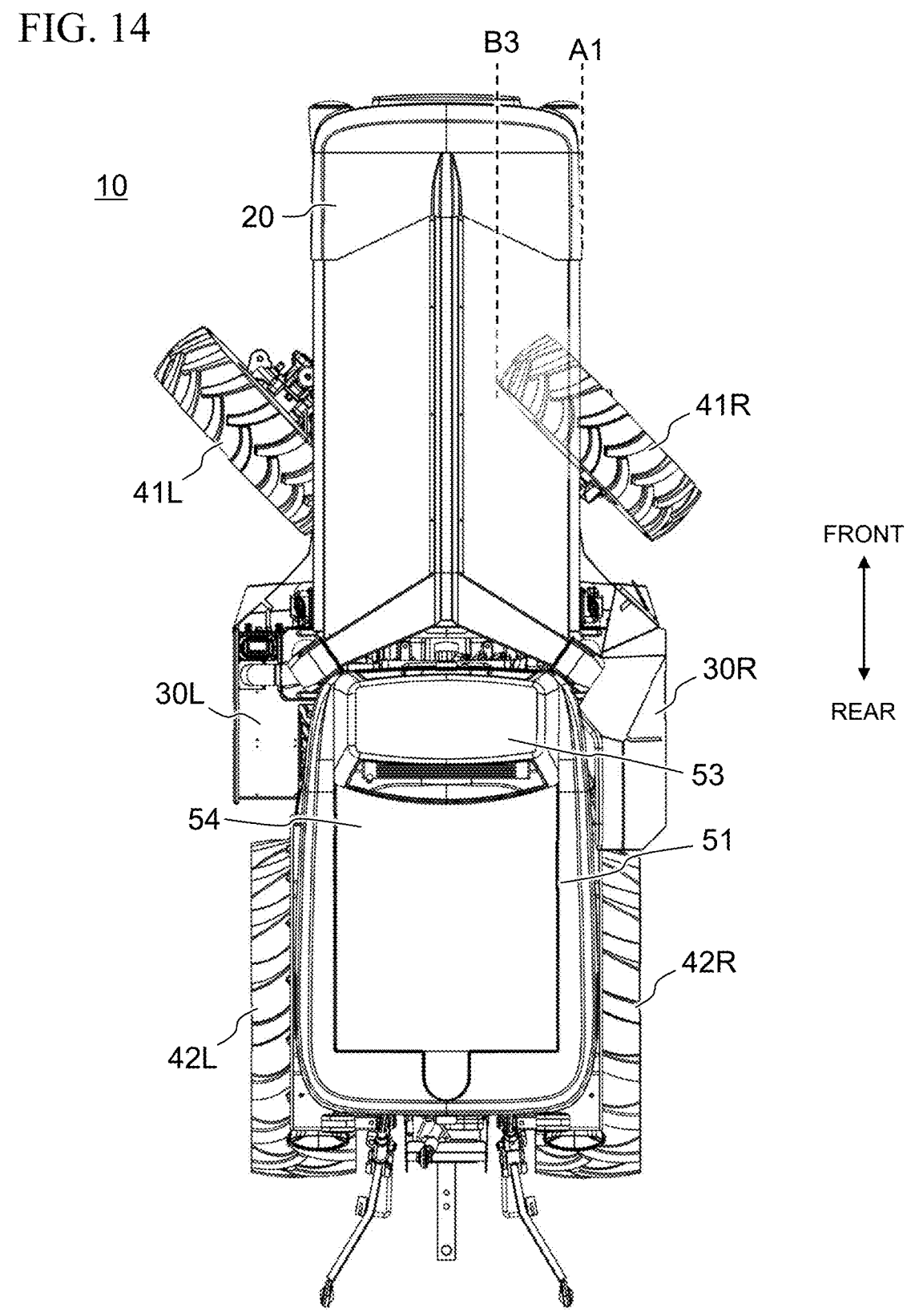
FIG. 14 is a top view of the vehicle shown in FIG. 1 with the front wheels turned.
Figure 15:
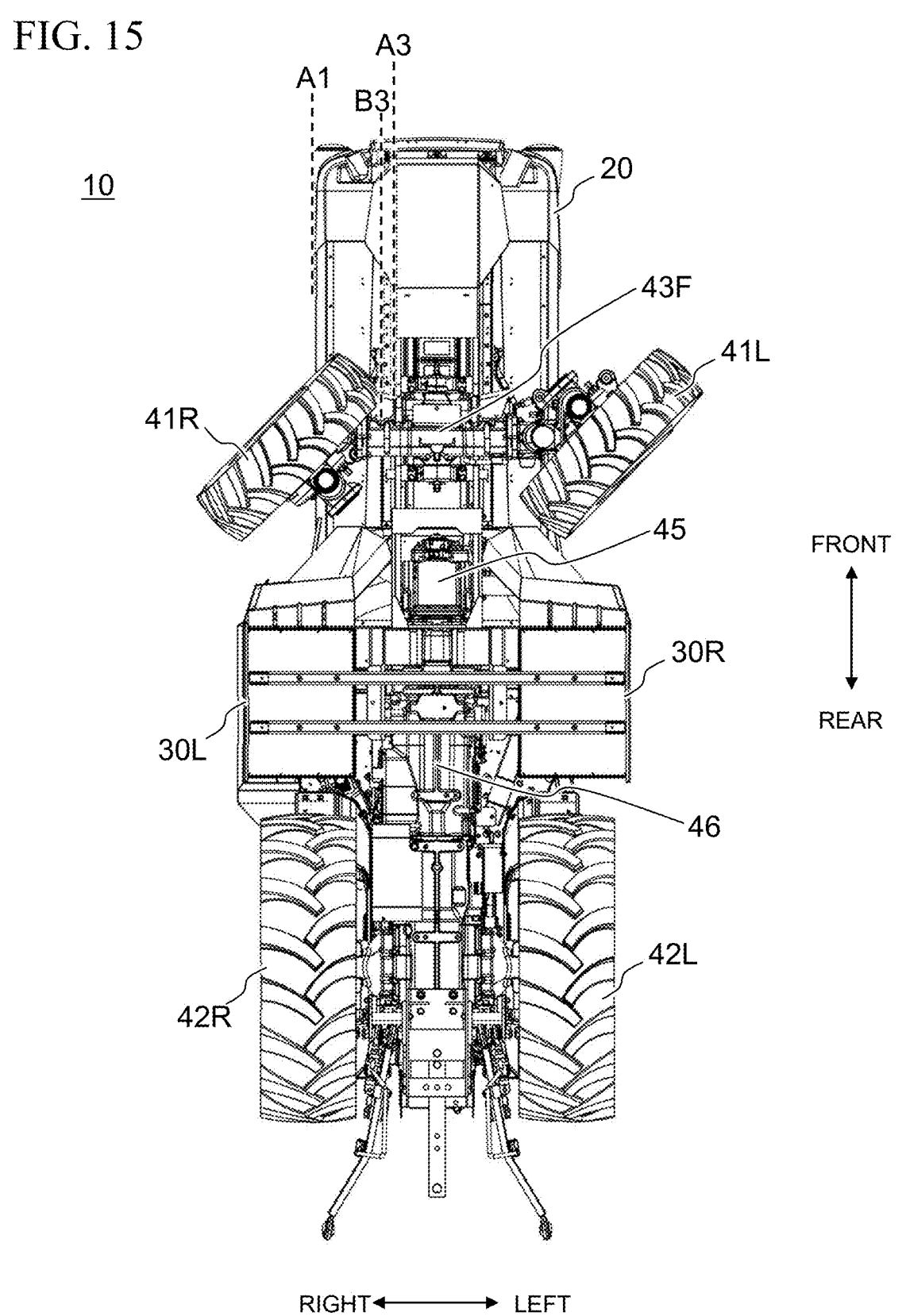
FIG. 15 is a bottom view of the vehicle shown in FIG. 1 with the front wheels turned.

FIGS. 12-15 are front, top, and bottom views of the vehicle 20 with the front wheels 41R and 41L turned. In FIG. 13, the first side housing 30L, the second side housing 30R, the rear wheels 42L and 42R, and the cabin 50 have been removed for clarity. FIGS. 12-15 show an example of the front wheels 41R and 41L turned by about 45 degrees when the vehicle 20 makes a left turn, which can represent a maximum turning extent B3 of the front wheels 41R and 41L when turned.

As shown in FIGS. 12-15, when the front wheels 41R and 41L are turned, the maximum turning extent B3 of each of the front wheels 41R and 41L (represented by the right front wheel 41R in FIGS. 12 and 13) can be located inside of the outer edge A1 of the main housing 20 or the first battery housing 60 in the width direction of the vehicle. The maximum turning extent B3 of each of the front wheels 41R and 41L can also be located outside of an outer edge A3 of the second battery housing 70 in the width direction of the vehicle. That is, the main housing 20 or the first battery housing 60 can overlap, in a vertical direction, a movement range of each of the front wheels 41R and 41L in a width/side (left-right) direction. In addition, the upper edge B2 of each of the front wheels 41R and 41L can be spaced away by a predetermined distance from the lower edge A2 of the main housing 20 or the first battery housing 60 regardless of the turning extent of the front wheels 41R and 41L within their respective movement ranges. Accordingly, the structure of the first battery housing 60 overhanging/extending farther than the second battery housing 70 in the width direction of the vehicle can provide a space for the front wheels of the vehicle to operate and turn, as shown in FIGS. 8-15.

Alternatively, according to a modified structural arrangement of the front wheels 41R and 41L with respect to the second battery housing 70, the maximum turning extent B3 of each of the front wheels 41R and 41L can be aligned or substantially aligned with the outer edge A3 of the second battery housing 70, or the maximum turning extent B3 of each of the front wheels 41R and 41L can be located inside of the outer edge A3 of the second battery housing 70.

As shown in FIGS. 10A and 10B, the first battery housing 60 and the second battery housing 70 can also be offset in a direction from the first (front) end of the vehicle to the second (rear) end of the vehicle. In particular, the second battery housing 70 can extend closer to the first (front) end of the vehicle 10 than the first battery housing 60. As an example, the second battery housing 70 can include at least one battery module 71A that is not overlapped by the first battery housing 60 in a vertical direction. A power distribution unit (PDU) 80 can be provided in a space defined by the forward offset of the second battery housing 70 with respect to the first battery housing 60 in the front-rear direction of the vehicle 10, as shown in FIGS. 8, 9, 10A, 10B, and 11. The PDU 80 can be implemented as an electrical multiplexer for high voltage sub-systems within the vehicle 10.

Furthermore, the first battery housing 60 can extend closer to the second (rear) end of the vehicle than the second battery housing 70. As an example, the first battery housing 60 can include at least one battery module 61A that is not overlapped by the second battery housing 70 in a vertical direction. Portion(s) of the first (left) side ducting 35L and/or the second (right) side ducting 35R can be provided in a space defined by the rearward offset of the first battery housing 60 with respect to the second battery housing 70 in the front-rear direction of the vehicle 10, as shown in FIG. 10A. Alternatively or in addition, at least a portion of the electric motor 45 can be located in the space defined by the rearward offset of the first battery housing 60 with respect to the second battery housing 70 in the front-rear direction of the vehicle 10, as shown in FIG. 10B. Furthermore, FIG. 10A shows that a space 45S can be defined by the rearward offset of the first battery housing 60 with respect to the second battery housing 70 in the front-rear direction of the vehicle 10, and the motor 45 and/or other vehicle components can be included in the space 45S.

As explained above, an offset between the first battery housing 60 and the second battery housing 70 can define a stepped shape or stepped shapes that provide space(s) in which one or more of the PDU 8, portion(s) of the first (left) side ducting 35L and/or the second (right) side ducting 35R, and at least a portion of the motor 45 can be located.

One or both of the first side housing 30L and the second side housing 30R can include a compressor or the like to provide cooling, via the first side ducting 35L and the second side ducting 35R, to one or more of the first battery housing 60, the second battery housing 70, the first side housing 30L, the second side housing 30R, and the PDU 80. One or both of the first side housing 30L and the second side housing 30R can also include evaporator coils and/or blower fans, shown generally at 36 in FIG. 10A. Blower fans can also be provided for one or both of first battery housing 60 and the second battery housing 70.

Figure 17:
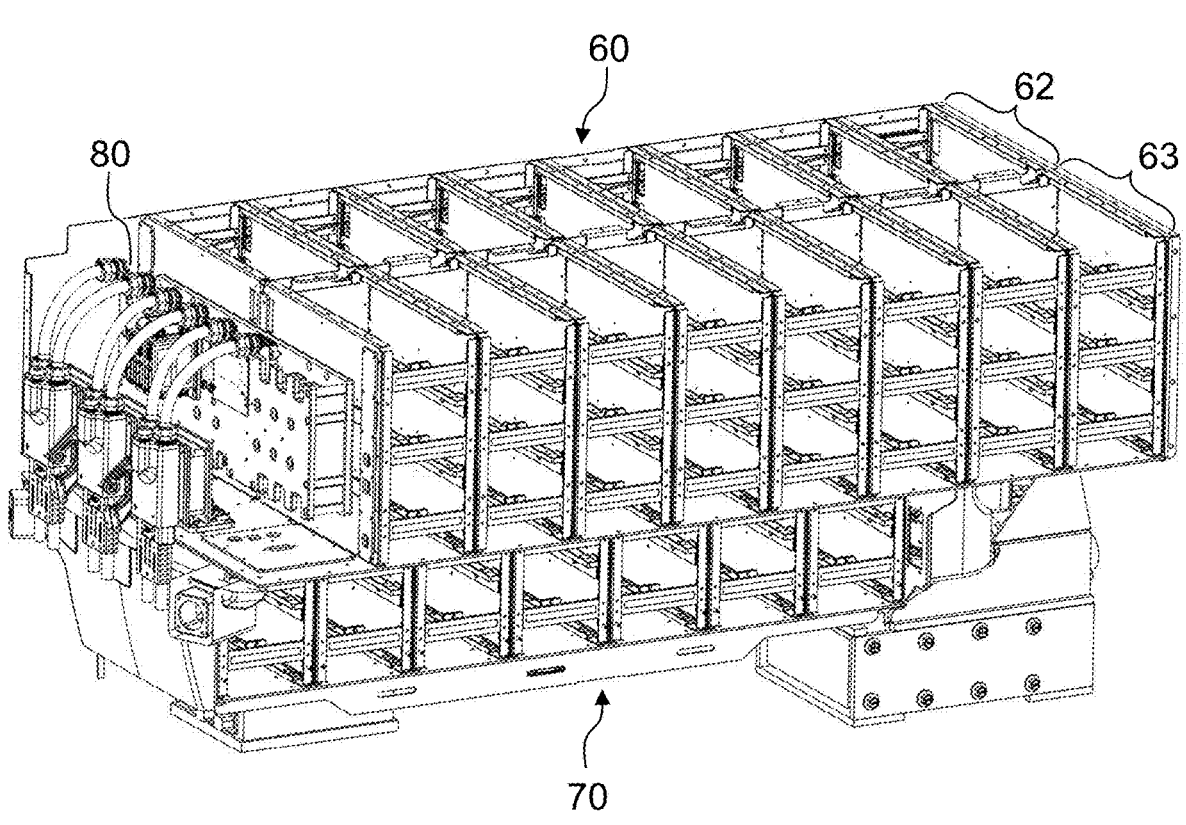
FIG. 17 is a perspective view of a battery housing included in the vehicle shown in FIG. 1 with battery modules removed for clarity.
Figure 18:
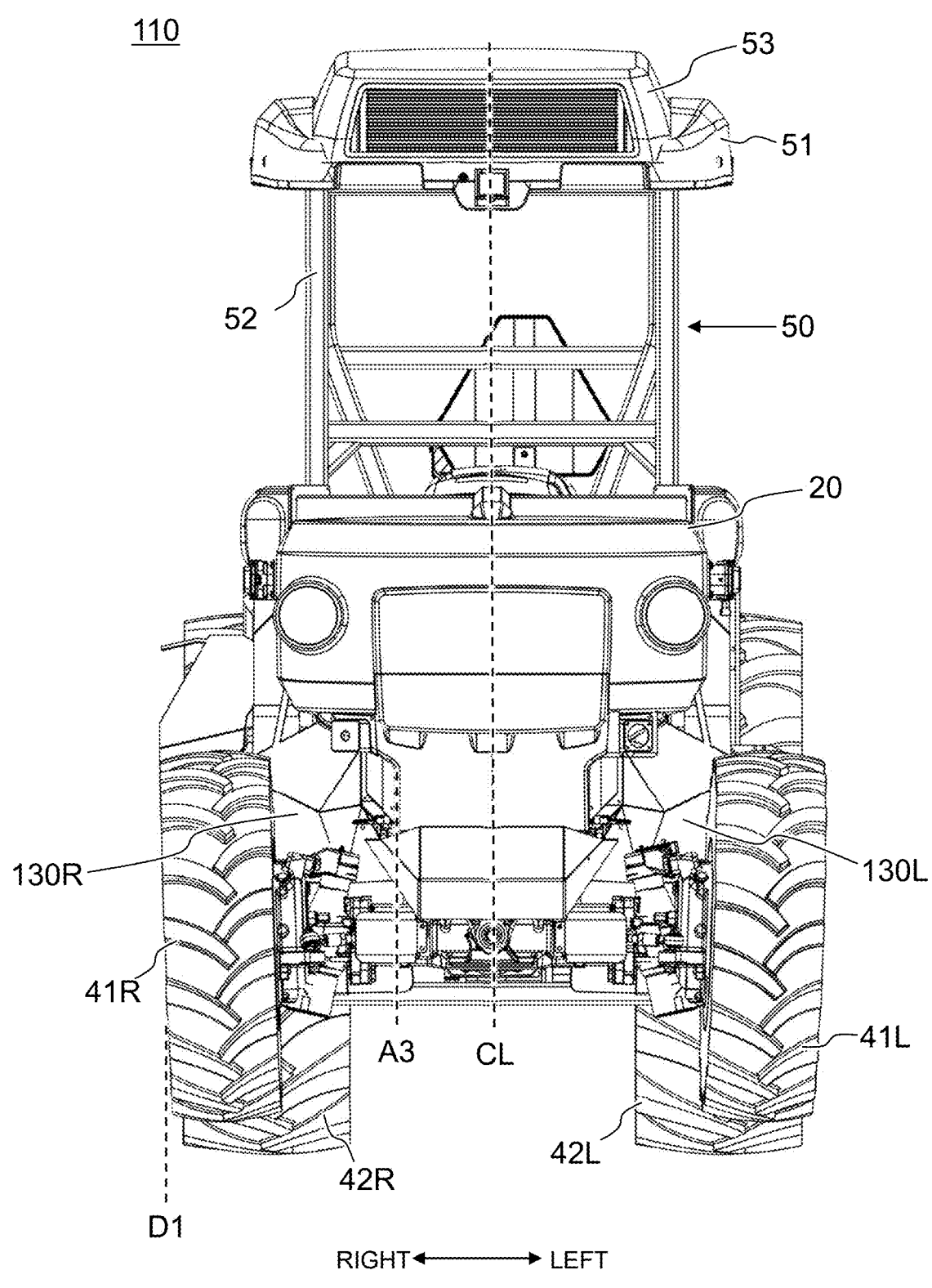
FIG. 18 shows a front view of a vehicle according to another preferred embodiment of the present invention.
Figure 19:
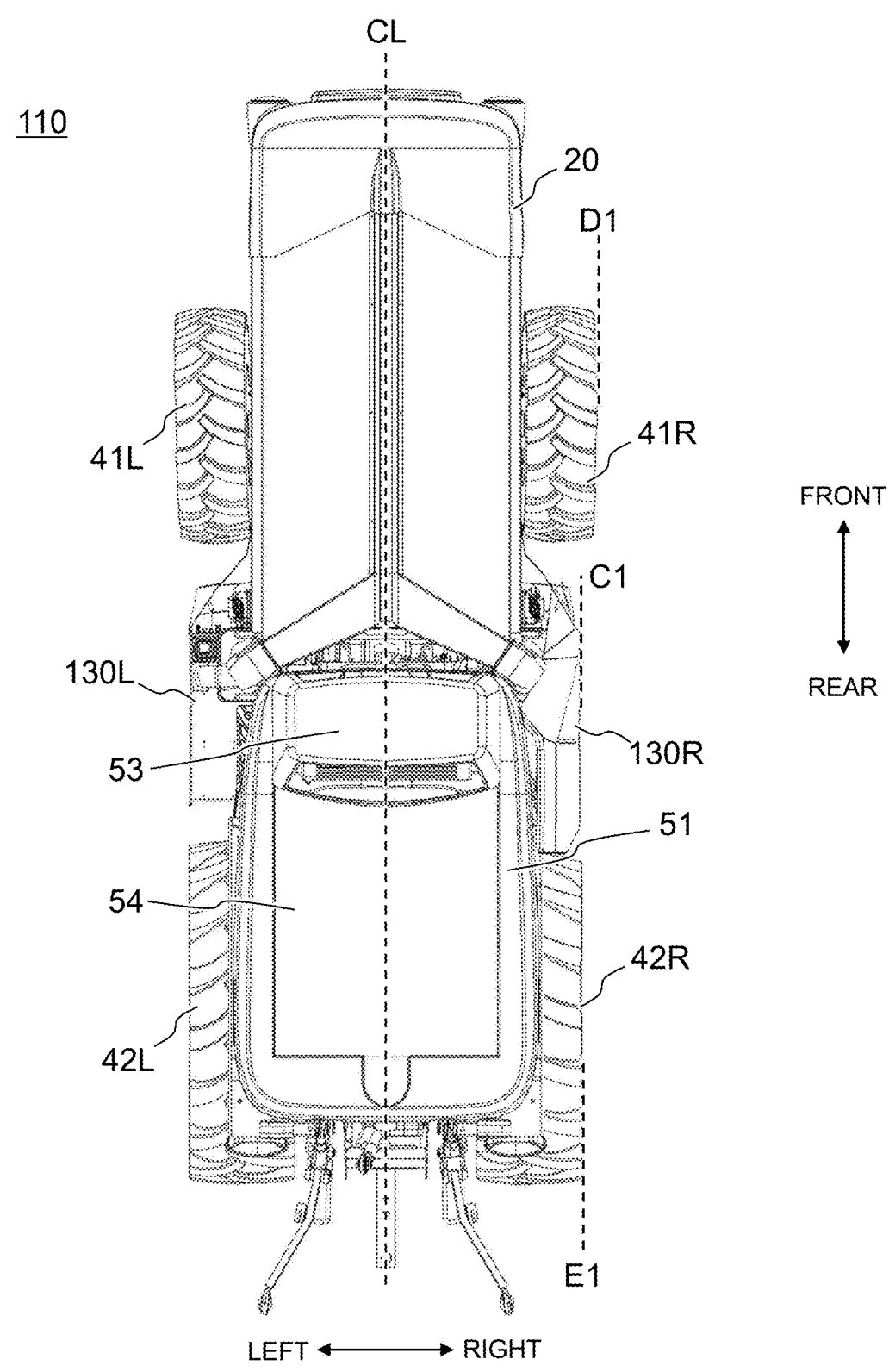
FIG. 19 is a top view of the vehicle shown in FIG. 18.
Figure 20:
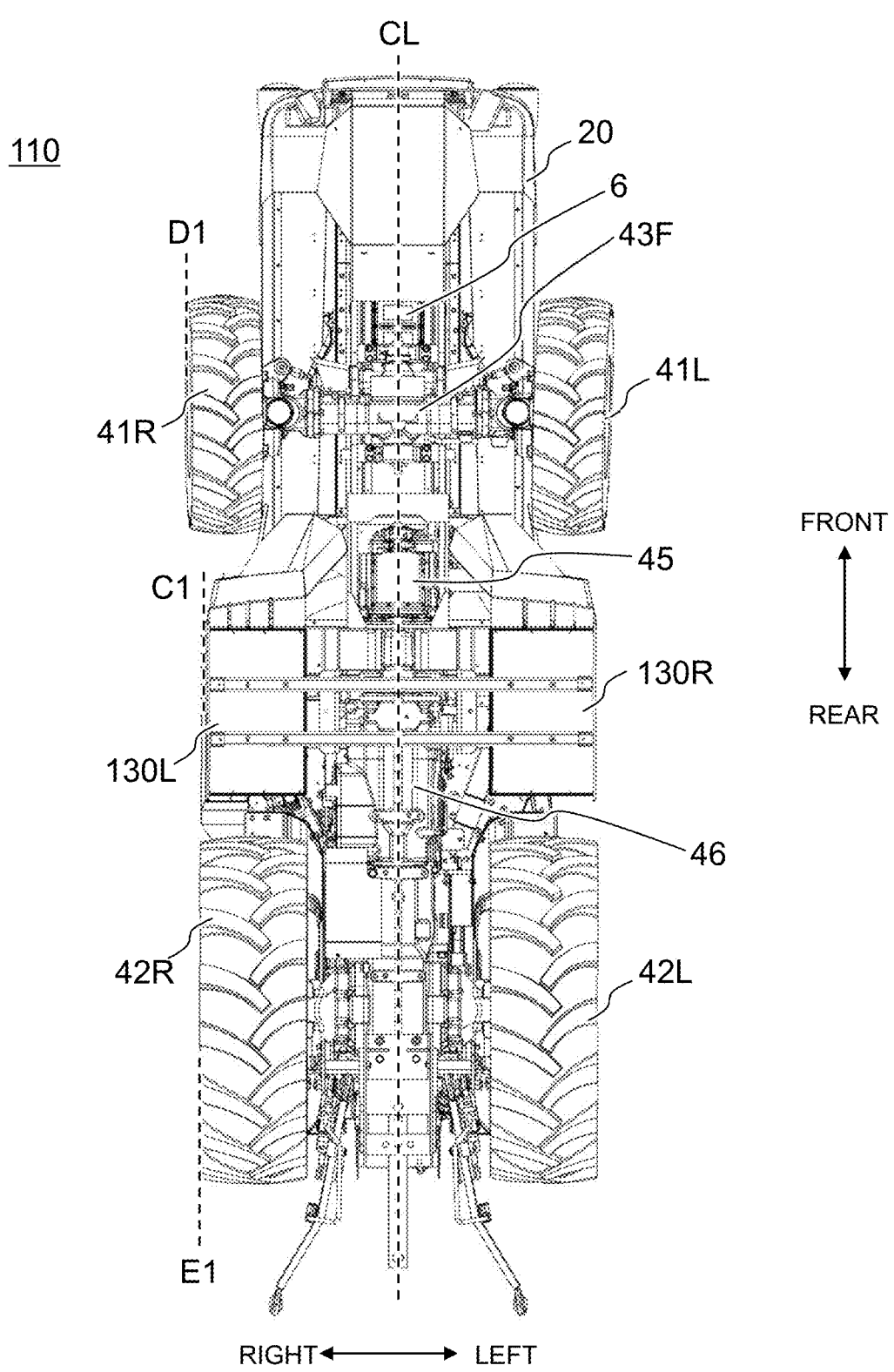
FIG. 20 is a bottom view of the vehicle shown in FIG. 18.
Figure 21:
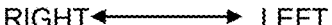
FIG. 21 is a front view of the vehicle shown in FIG. 18 with certain features removed for clarity.

FIG. 16 shows a top view of the first battery housing 60, and FIG. 17 shows a perspective view of the first battery housing 60 and the second battery housing 70 with their respective battery modules 61 and 71 removed for clarity. A housing of the PDU 80 is also removed from the view shown in FIG. 17. As shown in FIGS. 16 and 17, the first battery housing 60 includes a first battery module bank 62 and a second battery module bank 63. Each of the first battery module bank 62 and the second battery module bank 63 can include a plurality of the battery modules 61 provided in rows and columns. As an example, each of the first battery module bank 62 and the second battery module bank 63 can include three rows and eight columns of the battery modules 61, for a total of twenty-four of the battery modules 61 provided in the first battery module bank 62 and twenty-four of the battery modules provided in the second battery module bank 63.

The second battery housing 70 includes a third battery module bank 72. The third battery module bank 72 can include a plurality of the battery modules 71 provided in rows and columns. As an example, the third battery module bank 72 can include two rows and seven columns of the battery modules 71, for a total of fourteen of the battery modules 71 provided in the third battery module bank.

The first side housing 30L can store a plurality of battery modules 31L, and the second side housing 30R can store a plurality of battery modules 31R. The first side housing 30L can include a fourth battery module bank 32L with a plurality of the battery modules 31L provided in rows and columns, and the second side housing 30R can include a fifth battery module bank 32R with a plurality of the battery modules 32R provided in rows and columns. As examples, the fourth battery module bank 32L can include one row of two battery modules 31L and one row of three battery modules 31L, and the fifth battery module 32R bank can include one row of two battery modules 31R and one row of three battery modules 31R. Accordingly, a total of five of the battery modules 31L can be provided in the fourth battery module bank 32L, and a total of five of the battery modules 32R can be provided in the fifth battery module bank 32R.

Each of the fourth battery module bank 32L and the fifth battery module bank 32R can be provided in series with the third battery module bank 72 of the second battery housing 70.

Each of the battery modules 31L, 31R, 61, and 71 provided in the vehicle can be charged and discharged in groups. For example, one or two group(s) of battery modules can be discharged to provide electrical power to operate the vehicle 10 while other battery group(s) remain idle or are charged (e.g., by the solar panel 54). The first battery module bank 62 can define a first battery module group, the second battery module bank 63 can define a second battery module group, and the third battery module bank 72 can define a third battery module group. If the fourth battery module bank 32L and/or the fifth battery module bank 32R are included, the fourth battery module bank 32L and the fifth battery module bank 32R can be included in the third battery module group. Accordingly, each of the first, second, and third battery module groups can include a total of twenty-four battery modules. However, other groupings of battery modules can be provided, and are included within the preferred embodiments of the present invention. For example, the first battery module group can include a greater number of battery modules than the third group, and the second battery module group can include a greater number of battery modules than the third group.

The battery modules 61 included in the first battery module bank 62 (first battery group) can be connected in series with one another. Similarly, the battery modules 61 included in the second battery module bank 63 (second battery group) can be connected in series with one another. The battery modules 72 included in the third battery module bank 72 (third battery module group), the battery modules 31L included in the fourth battery module bank 32L (fourth battery module group), and the battery modules 31R included in the fifth battery module bank 32R (fifth battery module group) can all be connected, collectively, in series with one another.

Furthermore, the battery module bank 62 (first battery group) can be connected in parallel with the second battery module bank 63 (second battery group). The battery module bank 62 (first battery group) can also be connected in parallel with the series connection of the third battery module bank 72 (third battery module group), the fourth battery module bank 32L (fourth battery module group), and the fifth battery module bank 32R (fifth battery module group). Similarly, the battery module bank 63 (second battery group) can be connected in parallel with the series connection of the third battery module bank 72 (third battery module group), the fourth battery module bank 32L (fourth battery module group), and the fifth battery module bank 32R (fifth battery module group).

The battery modules 31L, 31R, 61, and 71 can be lithium titanium oxide (LTO) battery modules. Each of the battery modules 31L, 31R, 61, and 71 can have the same or substantially the same voltage and energy capacity. A total voltage and a total energy storage value of each of the first, second, and third battery module groups can be the same or substantially the same. In addition, each of the first, second, and third battery module groups can have a predetermined range of operational voltage, with a predetermined minimum voltage and a predetermined maximum voltage. The battery modules 31L, 31R, 61, and 71 can be sealed within their corresponding housing (first battery housing 60, second battery housing 70, first side housing 30L, or second side housing 30R), and each of the battery modules 31L, 31R, 61, and 71 can be removed and replaced upon failure.

As other examples, the battery modules 31L, 31R, 61, and 71 can be lithium ferrophosphate (LFP) battery modules or nickel manganese cobalt (NMC) battery modules. LFP battery modules or NMC battery modules can be provided as smaller and/or lighter battery modules than LTO battery modules.

Each of the battery modules 31L, 31R, 61, and 71 can be a removable battery module that can be individually installed and removed from the corresponding first battery housing 60, second battery housing 70, first side housing

30L, and second side housing 30R. However, the battery modules 31L, 31R, 61, and 71 can instead be sealed and secured within their corresponding housing (first battery housing 60, second battery housing 70, first side housing 30L, or second side housing 30R) to insulate the battery modules and/or prevent corrosion of battery terminals. As an example, terminals of the battery modules 31L, 31R, 61, and 71 can be oriented towards an interior of the vehicle 10.

As described above in an example, one or two group(s) of battery modules can be discharged to provide electrical power to operate the vehicle 10 while other battery group(s) remain idle or are charged. Accordingly, for example, battery modules included in the idle battery group(s) can be removed or replaced while the vehicle 10 is supplied with electrical power from the non-idle battery group(s).

Communication among the battery modules 31L, 31R, 61, and 71 can be provided by a battery management unit (BMU) or the like over a controller area network (CAN) bus. The BMU, or a plurality of BMUs, can be provided in or on one or more of the first battery housing 60, the second battery housing 70, the first side housing 30L, and the second side housing 30R, or can be provided at other location(s) in or on the vehicle 10. The vehicle 10 can also include battery management system (BMS) that aggregates information from each of the battery module groups. The BMS can be implemented by a supervisory control unit (SCU) that can be connected to the PDU 80. The BMS can control charging and discharging of the batteries, and preferably maintains each of the first, second, and third battery module groups in a state of charge between about 20% and about 80%, for example, to reduce battery degradation. The state of charge can be maintained on a cell level within each battery module, a battery module level, a battery module bank level, or on a battery module group level.

FIGS. 18-21 show a vehicle 110 according to another preferred embodiment of the present invention. As shown in the plan views of FIGS. 19 and 20, the vehicle 110 includes a first (left) side housing 130L and a second (right) side housing 130R that are located closer to a center line CL of the vehicle 110 in a left-right direction of the vehicle 110 than the first side housing 30L and the second side housing 30R of the vehicle 10. For example, an outer edge C1 of the second side housing 130R can be located closer to the center line CL of the vehicle 110 in the left-right direction than each of an outer edge D1 of the right front wheel 41R and an outer edge E1 of the right rear wheel 42R. Similarly, an outer edge of the first side housing 130L can be located closer to the center line CL of the vehicle 110 in the left-right direction of the vehicle 110 than each of an outer edge of the left front wheel 41L and an outer edge of the left rear wheel 42L. Furthermore, a line extending from the outer edge C1 of the second side housing 130R can pass through one or both of the right front wheel 41R and the right rear wheel 42R in a width direction of the right wheels 41R and 42R. Similarly, a line extending from the outer edge of the first side housing 130L can pass through one or both of the left front wheel 41L and the left rear wheel 42L in a width direction of the right wheels 41L and 42L.

However, the outer edge C1 of the second side housing 130R can instead be located closer to the center line CL of the vehicle 110 in the left-right direction than only one of the outer edge D1 of the right front wheel 41R and the outer edge E1 of the right rear wheel 42R. Similarly, the outer edge of the first side housing 130L can be located closer to the center line CL of the vehicle 110 in the left-right direction than only one of the outer edge of the left front wheel 41L and the outer edge of the left rear wheel 42L. For example, if a size of the rear wheels 42R and 42L is increased to provide improved traction, the outer edge C1 of the second side housing 130R can be located, in the left-right direction, between the outer edge D1 of the right front wheel 41R and the outer edge E1 of the right rear wheel 42R, and the outer edge of the first side housing 130L can also be located, in the left-right direction, between the outer edge of the left front wheel 41L and the outer edge of the left rear wheel 42L.

As another alternative, the outer edges of the first and second side housings 130R and 130L can also be located in line with, or substantially in line with, any of the wheels 41R, 41L, 42R, and 42L. The first and second side housings 130R and 130L can also be individually adjusted with respect to the center line CL of the vehicle 110.

Other elements of the vehicle 110 are the same as, or similar to, the vehicle 10 described above, and repeated description thereof is omitted.

According to another preferred embodiment of the present invention, the main housing 20 may be shortened to improve visibility of objects in front of the vehicle 10 or 110 for an operator located in the cabin 50. Alternatively or in addition, an upper surface of the upper housing 20 may be angled downward in a direction from the rear of the vehicle 10 or 110 toward the front of the vehicle 10 or 110 to improve visibility of objects in front of the vehicle 10 or 110 for an operator located in the cabin 50.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A work vehicle comprising:
a main body;
at least one front wheel supported by the main body;
at least one rear wheel supported by the main body;
a first housing to house one or more first battery modules;
a second housing to house one or more second battery modules;
a first side housing that is separate from the first housing and the second housing;
a second side housing that includes one or more third battery modules; and
a transmission driven by an electric motor that drives one or more of the at least one front wheel and the at least one rear wheel; wherein
the first housing at least partially overlaps the second housing viewed from a vertical direction;
the first side housing includes one or more third battery modules;
the first side housing is spaced away from the first housing and the second housing; and
the one or more third battery modules included in the first side housing are electrically connected to at least the one or more second battery modules included in the second housing;
the transmission is mounted between the first side housing and the second side housing in a width direction of the work vehicle; and the electric motor is mounted in front of a line extending from a front surface of the first side housing and the second side housing.

2. The work vehicle according to claim 1, wherein the one or more first battery modules and the one or more second battery modules are a same type of battery module.

3. The work vehicle according to claim 1, wherein the first housing includes one or more first openings that are configured to receive the one or more first battery modules; and
the second housing includes one or more second openings that are configured to receive the one or more second battery modules.

4. The work vehicle according to claim 3, wherein:
the one or more first openings and the one or more second openings face a width direction of the work vehicle; and
the one or more first openings provide access to first sub-housings that each receive a separate one of the one or more first battery modules, and the one or more second openings provide access to second sub-housings that each receive a separate one of the one or more second battery modules.

5. The work vehicle according to claim 1, wherein, in a plan view, an outer surface of the first side housing is located closer to a center line of the work vehicle than an outer surface of the at least one front wheel.

6. The work vehicle according to claim 1, wherein, in a plan view, an outer surface of the first side housing is located closer to a center line of the work vehicle than an outer surface of the at least one rear wheel.

7. The work vehicle according to claim 1, wherein a line extending from an outer surface of the first side housing in a front-rear direction of the work vehicle passes through the at least one front wheel.

8. The work vehicle according to claim 1, wherein a line extending from an outer surface of the first side housing in a front-rear direction of the work vehicle passes through the at least one rear wheel.

9. The work vehicle according to claim 1, wherein the second side housing is spaced away from the first housing, the second housing, and the first side housing.

10. The work vehicle according to claim 1, wherein the one or more third battery modules included in the second side housing are electrically connected to at least the one or more second battery modules included in the second housing.

11. The work vehicle according to claim 1, wherein, in a plan view, an outer surface of the second side housing is located closer to a center line of the work vehicle than an outer surface of the at least one front wheel.

12. The work vehicle according to claim 1, wherein, in a plan view, an outer surface of the second side housing is located closer to a center line of the work vehicle than an outer surface of the at least one rear wheel.

13. The work vehicle according to claim 1, wherein a line extending from an outer surface of the second side housing in a front-rear direction of the work vehicle housing passes through the at least one front wheel.

14. The work vehicle according to claim 1, wherein a line extending from an outer surface of the second side housing in a front-rear direction of the work vehicle passes through the at least one rear wheel.

* * * * *